US012657460B2

(12) United States Patent
Conchuir et al.

(10) Patent No.: US 12,657,460 B2
(45) Date of Patent: Jun. 16, 2026

(54) MACHINE LEARNING TECHNIQUES FOR GENERATING IMPACT MEASURES USING NONLINEAR CAUSAL INFERENCE AND PREDICTIVE RISK SCORES

(71) Applicant: Optum Services (Ireland) Limited, Dublin (IE)

(72) Inventors: Breanndan O Conchuir, Warrington (GB); Siddharth G. Sheshadri, Dublin (IE); Conor John Waldron, Dublin (IE); Michael J. McCarthy, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 509 days.

(21) Appl. No.: 18/327,253

(22) Filed: Jun. 1, 2023

(65) Prior Publication Data
US 2024/0403628 A1    Dec. 5, 2024

(51) Int. Cl.
*G06N 3/08*          (2023.01)

(52) U.S. Cl.
CPC ...................................... *G06N 3/08* (2013.01)

(58) Field of Classification Search
CPC . G06N 20/00; G06N 3/08; G06N 5/04; G06F 9/5027
USPC .......................................................... 705/21
See application file for complete search history.

(56) References Cited

U.S. PATENT DOCUMENTS

| | | | |
|---|---|---|---|
| 8,027,849 B2 | 9/2011 | Johnson et al. | |
| 8,200,506 B2 | 6/2012 | Kil | |
| 9,536,052 B2 * | 1/2017 | Amarasingham | G16H 50/30 |

| | | | |
|---|---|---|---|
| 9,916,099 B2 | 3/2018 | Alapati et al. | |
| 10,074,059 B1 | 9/2018 | Albro et al. | |
| 10,204,705 B2 * | 2/2019 | Lee | G06F 16/162 |
| 10,332,624 B2 * | 6/2019 | Berdia | G16H 10/60 |
| 10,482,385 B2 | 11/2019 | Narain et al. | |
| 10,636,002 B2 * | 4/2020 | Sessoms | G06Q 10/063114 |
| 10,667,680 B2 * | 6/2020 | Gupta | A61B 5/7275 |
| 10,825,167 B2 * | 11/2020 | Rapaka | G06T 7/0012 |

(Continued)

FOREIGN PATENT DOCUMENTS

| | | |
|---|---|---|
| WO | 2015/077708 A1 | 5/2015 |
| WO | 2024/136904 A1 | 6/2024 |

OTHER PUBLICATIONS

Lamsaf, Asmae, et al., "Causality, Machine Learning, and Feature Selection: A Survey", Sensors, Apr. 9, 2025, 25 pages, vol. 2025, issue 25, No. 2373, pp. 1-25 MDPI, Switzerland.

(Continued)

*Primary Examiner* — Pritham D Prabhakher

(74) *Attorney, Agent, or Firm* — ALSTON & BIRD LLP

(57)          ABSTRACT

Various embodiments of the present disclosure provide techniques for improving causal inference modeling with respect to predictive labels in a complex predictive domain. The techniques of the present disclosure may include generating a positive cohort and a negative cohort of data objects from a dataset based on an associated with a predictive label, generating a positive cohort impact measure for the positive cohort and one or more negative cohort impact measures for the negative cohort, and generating an object impact measure for a particular data object of the negative cohort based on the positive cohort impact measure and at least one of the negative cohort impact measures.

20 Claims, 10 Drawing Sheets

(56) References Cited

U.S. PATENT DOCUMENTS

| | | | | |
|---|---|---|---|---|
| 11,037,676 | B2 * | 6/2021 | Lee | G01C 21/206 |
| 11,037,685 | B2 * | 6/2021 | Lefkofsky | G16H 10/20 |
| 11,086,687 | B2 | 8/2021 | Bishop et al. | |
| 11,094,413 | B1 | 8/2021 | Golenski et al. | |
| 11,147,459 | B2 | 10/2021 | Sobol et al. | |
| 11,250,958 | B2 | 2/2022 | Asthana et al. | |
| 11,264,128 | B2 * | 3/2022 | Brown | G16H 50/20 |
| 11,278,246 | B1 | 3/2022 | McNair | |
| 11,651,291 | B2 * | 5/2023 | Karanth | G06N 20/00 |
| | | | | 706/12 |
| 11,687,380 | B2 | 6/2023 | Fawcett et al. | |
| 11,790,268 | B1 * | 10/2023 | Wick | G06N 5/04 |
| | | | | 706/12 |
| 11,798,689 | B2 * | 10/2023 | Hogue | G16H 20/40 |
| 11,875,903 | B2 * | 1/2024 | Schaeffer | G06Q 10/10 |
| 12,046,360 | B2 * | 7/2024 | Kogan | G01C 21/3697 |
| 12,062,434 | B2 * | 8/2024 | Day | G16H 40/20 |
| 12,444,503 | B2 | 10/2025 | Mcgrath et al. | |
| 12,511,554 | B2 * | 12/2025 | Nasr-Azadani | G06N 5/04 |
| 2008/0147438 | A1 * | 6/2008 | Kil | G16H 20/00 |
| | | | | 705/2 |
| 2010/0312581 | A1 | 12/2010 | Wachtell et al. | |
| 2012/0221368 | A1 | 8/2012 | Sui et al. | |
| 2013/0262357 | A1 | 10/2013 | Amarasingham et al. | |
| 2014/0136230 | A1 | 5/2014 | Berdia | |
| 2016/0055445 | A1 | 2/2016 | Sessoms et al. | |
| 2016/0171383 | A1 * | 6/2016 | Narain | G16H 50/70 |
| | | | | 706/52 |
| 2016/0253462 | A1 | 9/2016 | Zhong et al. | |
| 2016/0266816 | A1 * | 9/2016 | Alapati | G06F 3/0653 |
| 2016/0292248 | A1 | 10/2016 | Garcia | |
| 2017/0147762 | A1 | 5/2017 | Vallee | |
| 2017/0212994 | A1 | 7/2017 | Lee et al. | |
| 2018/0102190 | A1 | 4/2018 | Hogue et al. | |
| 2018/0113982 | A1 * | 4/2018 | Asthana | G06N 5/045 |
| 2018/0160894 | A1 | 6/2018 | Gupta et al. | |
| 2018/0226150 | A1 | 8/2018 | Hayter et al. | |
| 2018/0315182 | A1 | 11/2018 | Rapaka et al. | |
| 2019/0108909 | A1 | 4/2019 | Lee et al. | |
| 2019/0138367 | A1 * | 5/2019 | Bishop | G06F 9/5083 |
| 2019/0209022 | A1 * | 7/2019 | Sobol | A61B 5/681 |
| 2019/0267133 | A1 | 8/2019 | Schwarz et al. | |
| 2019/0371460 | A1 | 12/2019 | Gutierrez | |
| 2020/0058393 | A1 | 2/2020 | Wang et al. | |
| 2020/0210965 | A1 | 7/2020 | Garber et al. | |
| 2020/0312443 | A1 | 10/2020 | De Massari et al. | |
| 2020/0411170 | A1 | 12/2020 | Brown et al. | |
| 2021/0020305 | A1 | 1/2021 | Ray | |
| 2021/0110287 | A1 * | 4/2021 | Perov | G06N 7/01 |
| 2021/0125730 | A1 * | 4/2021 | Lefkofsky | G16H 20/10 |
| 2021/0241179 | A1 | 8/2021 | Karanth et al. | |
| 2021/0319884 | A1 | 10/2021 | Day et al. | |
| 2022/0019914 | A1 | 1/2022 | James et al. | |
| 2022/0044826 | A1 * | 2/2022 | Schaeffer | G16H 50/70 |
| 2022/0075664 | A1 * | 3/2022 | Fawcett | G06F 9/4881 |
| 2022/0130529 | A1 | 4/2022 | Al-Abbasi et al. | |
| 2022/0309370 | A1 * | 9/2022 | Mason | G06F 11/3438 |
| 2022/0367051 | A1 * | 11/2022 | Mcgrath | G06N 3/045 |
| 2022/0405614 | A1 * | 12/2022 | Nasr-Azadani | G06N 5/04 |
| 2023/0005607 | A1 | 1/2023 | Kogan et al. | |
| 2023/0142594 | A1 | 5/2023 | Eberhardt et al. | |
| 2023/0207097 | A1 * | 6/2023 | Mason | A63B 24/0075 |
| | | | | 705/3 |
| 2024/0047042 | A1 | 2/2024 | Daza | |
| 2024/0362068 | A1 | 10/2024 | O Conchuir et al. | |
| 2025/0259041 | A1 | 8/2025 | Crabtree et al. | |

OTHER PUBLICATIONS

Non-Final Rejection Mailed on Oct. 22, 2025 for U.S. Appl. No. 17/935,392, 8 page(s).

Sharmam, Harsh, et al., "Counterfactual AI in Healthcare: Enhancing Decision-Making and Outcome Prediction", IEEE 2025 Seventh International Conference on Computation Intelligence and Communication Technologies (CCICT), Apr. 11-12, 2025, pp. 608-615, Sonepat, India.

Alves, Matheus Facure. "22—Debiased/Orthogonal Machine Learning", Causal Inference for The Brave and True, (Year: 2022), (20 pages), available online: https://matheusfacure.github.io/python-causality-handbook/22-Debiased-Orthogonal-Machine-Learning.html#ml-for-nuisance-parameter>.

Arias, Michael et al. "Mapping The Patient's Journey in Healthcare Through Process Mining," International Journal of Environmental Research and Public Health, vol. 17, No. 18:6586, Sep. 10, 2020, pp. 1-16, DOI: 10.3390/ijerph17186586.

Chernozhukov, Victor et al. "Double/Debiased Machine Learning for Treatment and Causal Parameters," arXiv:1608.00060v6 [stat. ML], Dec. 12, 2017, pp. 1-71, available online: https://arxiv.org/pdf/1608.00060v6.pdf.

Chernozhukov, Victor et al. "Double/Debiased Machine Learning for Treatment and Structural Parameters," Econometrics Journal, vol. 21, (Year: 2018), pp. CA-C68, DOI: 10.1111/ectj.12097.

Choi, Edward et al. "Retain: An Interpretable Predictive Model for Healthcare using Reverse Time Attention Mechanism", 30th Conference on Neural Information Processing Systems (NIPS 2016), vol. 29, (Year: 2016), pp. 1-9, Barcelona, Spain, available online: https://proceedings.neurips.cc/paper/2016/file/231141b34c82aa95e48810a9d1b33a79-Paper.pdf.

Facure, Matheus. "22—Debiased/Orthogonal Machine Learning," Causal Inference for The Brave and True, (Year: 2022), (20 pages), available online: https://matheusfacure.github.io/python-causality-handbook/22-Debiased-Orthogonal-Machine-Learning.html#ml-for-nuisance-parameters.

Hessam, Mohammad et al. "An Integrated Deep Learning and Stochastic Optimization Approach for Resource Management in Team-Based Healthcare Systems," Expert Systems with Applications. vol. 187:115924, Jan. 1, 2022, (29 pages), available online: https://www.sciencedirect.com/science/article/abs/pii/S0957417421012781.

Huang, Yongxi et al. "Optimal Allocation of Multiple Emergency Service Resources for Protection of Critical Transportation Infrastructure," Transportation Research Record: Journal of the Transportation Research Board, vol. 2022, No. 1, Jan. 2007, pp. 1-8, Transportation Research Board of the National Academies, Washington D.C., DOI: 10.3141/2022-01.

Hynninen, Yrjana. "Operationalization of Utilitarian and Egalitarian Objectives for Optimal Allocation," Decision Sciences, vol. 52, No. 5, Oct. 2021, pp. 1169-1208, Available Online: https://onlinelibrary.wiley.com/doi/pdfdirect/10.1111/deci.12448.

Li, Yafei et al. "Optimal Scheduling in Cloud Healthcare System Using Q-Learning Algorithm," Complex & Intelligent Systems, vol. 8, Jun. 23, 2022, pp. 4603-4618, DOI: 10.1007/s40747-022-00776-9.

Liu, Dianbo et al. "Machine Learning Approaches to Predicting No-Shows in Pediatric Medical Appointment," NPJ|Digital Medicine, vol. 5, No. 50, Apr. 20, 2022, pp. 1-11, DOI: 10.1038/s41746-022-00594-w.

Ren, Dongning et al. "Nonlinear Effect of Social Interaction Quantity on Psychological Well-Being: Diminishing Returns or Inverted U?", Journal of Personality and Social Psychology: Interpersonal Relations and Group Processes, vol. 122, No. 6, Jun. 2022, pp. 1056-1074, DOI: 10.1037/pspi0000373.

Riverin, Bruno D. "Innovations and Opportunities for Primary Health Care After Hospital Discharge: An Application of Causal Inference Methods in Health Services Research", Thesis, McGill University, Montreal, Quebec, Canada, (Year: 2016), (155 pages), available online: https://escholarship.mcgill.ca/concern/theses/w6634628z>.

Schuurmans, Megan et al. "Setting The Research Agenda for Clinical Artificial Intelligence in Pancreatic Adenocarcinoma Imaging," Cancers, vol. 14, No. 14:3498, Jul. 19, 2022, pp. 1-20, DOI: 10.3390/cancers14143498.

* cited by examiner

ATTRIBUTES 403

MEDICAL CLAIM DATA 501

MEDICAL LAB DATA 503

MEDICAL CHART DATA 505

USER DATA 507

500

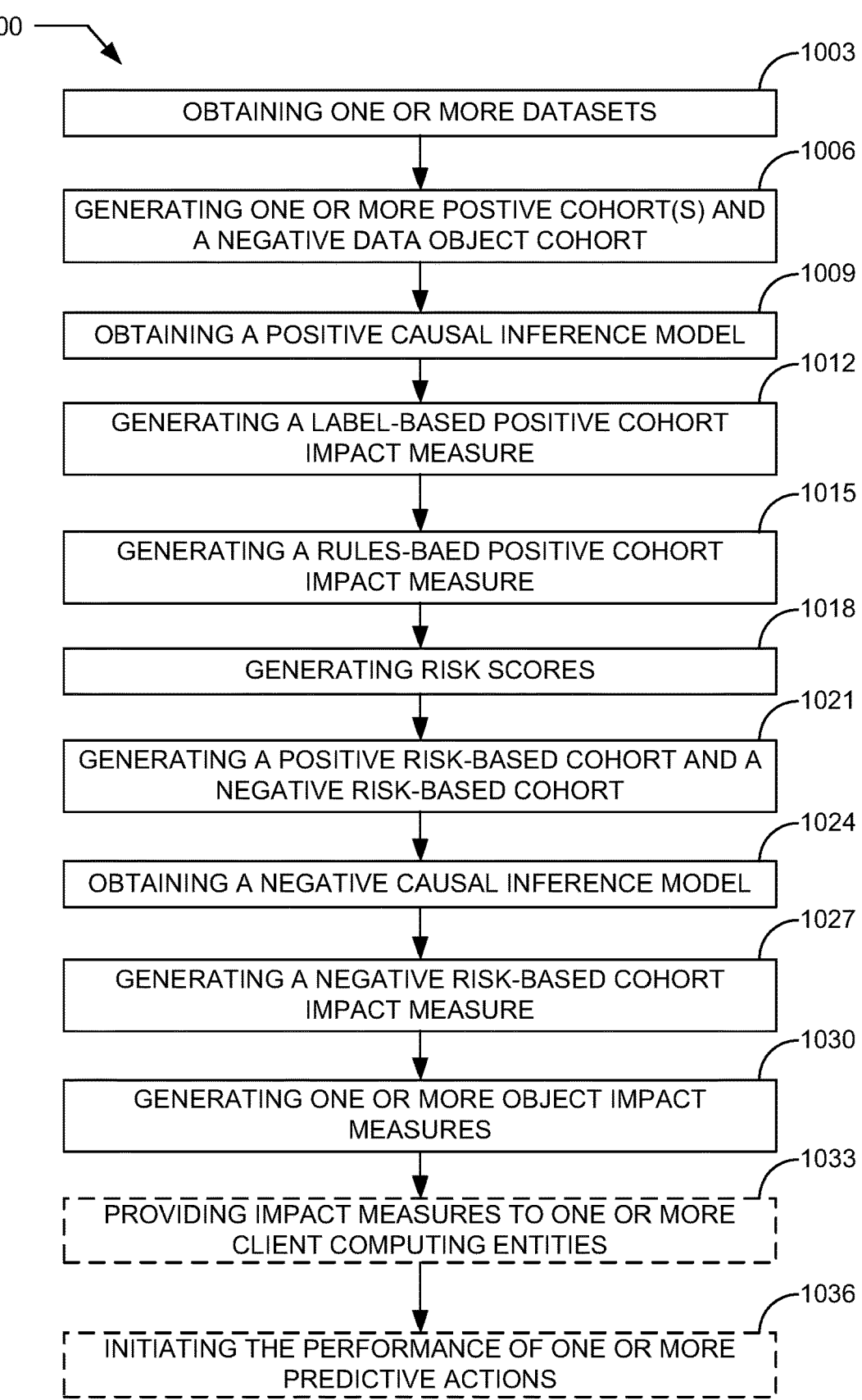

1000

1003
OBTAINING ONE OR MORE DATASETS

1006
GENERATING ONE OR MORE POSTIVE COHORT(S) AND A NEGATIVE DATA OBJECT COHORT

1009
OBTAINING A POSITIVE CAUSAL INFERENCE MODEL

1012
GENERATING A LABEL-BASED POSITIVE COHORT IMPACT MEASURE

1015
GENERATING A RULES-BAED POSITIVE COHORT IMPACT MEASURE

1018
GENERATING RISK SCORES

1021
GENERATING A POSITIVE RISK-BASED COHORT AND A NEGATIVE RISK-BASED COHORT

1024
OBTAINING A NEGATIVE CAUSAL INFERENCE MODEL

1027
GENERATING A NEGATIVE RISK-BASED COHORT IMPACT MEASURE

1030
GENERATING ONE OR MORE OBJECT IMPACT MEASURES

1033
PROVIDING IMPACT MEASURES TO ONE OR MORE CLIENT COMPUTING ENTITIES

1036
INITIATING THE PERFORMANCE OF ONE OR MORE PREDICTIVE ACTIONS

FIG. 10

MACHINE LEARNING TECHNIQUES FOR GENERATING IMPACT MEASURES USING NONLINEAR CAUSAL INFERENCE AND PREDICTIVE RISK SCORES

BACKGROUND

Various embodiments of the present disclosure address technical challenges related to managing computing systems with finite resources and distributing resources to data objects based on association or non-association of each data object with a predictive label. Existing processes for distributing resources, such as clinical care resources, rely on generic associative frameworks for determining whether a data object is associated with a predictive label. Predictive labels are then used to predict a causal effect of distributing a resource to a data object with respect to a predictive outcome of interest. Predictive labels are dependent on the attributes of a data object. Thus, traditional approaches for distributing resources to data objects based on predictive labels fail to account and control for instances in which the known attributes of a data object are incomplete or inaccurate. Various embodiments of the present disclosure make important contributions to various existing resource distribution techniques by addressing these technical challenges.

BRIEF SUMMARY

Various embodiments of the present disclosure provide methods, apparatus, systems, computing devices, computing entities, and/or the like for generating cohorts of data objects with respect to a predictive label and predicting impact measures for the cohorts of data objects with respect to a predictive outcome of interest. Some of the techniques of the present disclosure, may leverage deterministic rules and machine learning prediction models to generate cohorts of data objects that are associated or unassociated with a predictive label. Some of the techniques of the present disclosure, may leverage nonlinear causal inference modeling to generate impact measures for each cohort of data objects and for individual data objects with respect to a predictive outcome of interest. The impact measure may be a measure of causal effect for one or more causal variables on a predictive outcome. Some of the techniques of the present disclosure generate label-based cohorts, rules-based cohorts, and risk-based cohorts of data objects that are associated with a predictive label (e.g., positive) or unassociated with the predictive label (e.g., negative) based on attributes of the data objects and other data, such as knowledge graph data. Some of the techniques of the present disclosure leverage deterministic rules and machine learning prediction models to account for instances of incomplete or inaccurate attributes of one or more data objects. Some of the techniques of the present disclosure may be practically applied to efficiently distribute limited resources to one or more data objects to optimize targeted predictive outcomes across the plurality of data objects. The limited resources may be distributed based on causal inferences that are tailored to subsets of the data objects based on each data object's association with a predictive label. As described herein, some of the techniques of the present disclosure enable the prediction of such associations in instances where attributes for a data object is incomplete or inaccurate. In doing so, the some of the techniques of the present disclosure may improve accuracy of causal effect predictions and increase efficiency of resource distribution to data objects.

In some embodiments, a computer-implemented method includes generating, by one or more processors, a plurality of data object cohorts from a dataset, wherein the plurality of data object cohorts comprise one or more positive cohorts with a first plurality of data objects associated with a predictive label, one or more negative cohorts with a second plurality of data objects unassociated with the predictive label, generating, by the one or more processors and using a positive causal inference model, a positive cohort impact measure for the one or more positive cohorts, generating, by the one or more processors and using a machine learning prediction model, a plurality of risk scores associated with the predictive label for the one or more negative cohorts, generating, by the one or more processors, a positive risk-based cohort and a negative risk-based cohort from the one or more negative cohorts based on the plurality of risk scores, and generating, by the one or more processors, an object impact measure for a particular data object of the positive risk-based cohort based on the plurality of risk scores, the positive cohort impact measure, and a negative cohort impact measure corresponding to the negative risk-based cohort.

In some embodiments, a system includes memory and one or more processors communicatively coupled to the memory, the one or more processors configured to generate a plurality of data object cohorts from a dataset, wherein the plurality of data object cohorts comprise one or more positive cohorts with a first plurality of data objects associated with a predictive label, one or more negative cohorts with a second plurality of data objects unassociated with the predictive label, generate, using a positive causal inference model, a positive cohort impact measure for the one or more positive cohorts, generate, using a machine learning prediction model, a plurality of risk scores associated with the predictive label for the one or more negative cohorts, generate a positive risk-based cohort and a negative risk-based cohort from the one or more negative cohorts based on the plurality of risk scores, and generate an object impact measure for a particular data object of the positive risk-based cohort based on the plurality of risk scores, the positive cohort impact measure, and a negative cohort impact measure corresponding to the negative risk-based cohort.

In some embodiments, one or more non-transitory, computer-readable storage media including instructions that, when executed by one or more processors, causes the one or more processors to generate a plurality of data object cohorts from a dataset, wherein the plurality of data object cohorts comprise one or more positive cohorts with a first plurality of data objects associated with a predictive label, one or more negative cohorts with a second plurality of data objects unassociated with the predictive label, generate, using a positive causal inference model, a positive cohort impact measure for the one or more positive cohorts, generate, using a machine learning prediction model, a plurality of risk scores associated with the predictive label for the one or more negative cohorts, generate a positive risk-based cohort and a negative risk-based cohort from the one or more negative cohorts based on the plurality of risk scores, and generate an object impact measure for a particular data object of the positive risk-based cohort based on the plurality of risk scores, the positive cohort impact measure, and a negative cohort impact measure corresponding to the negative risk-based cohort.

BRIEF DESCRIPTION OF THE DRAWINGS

FIG. 10 is a flowchart diagram of an example process for generating impact measures for data objects and cohorts of data objects in accordance with some embodiments described herein.

DETAILED DESCRIPTION

Figure 1:
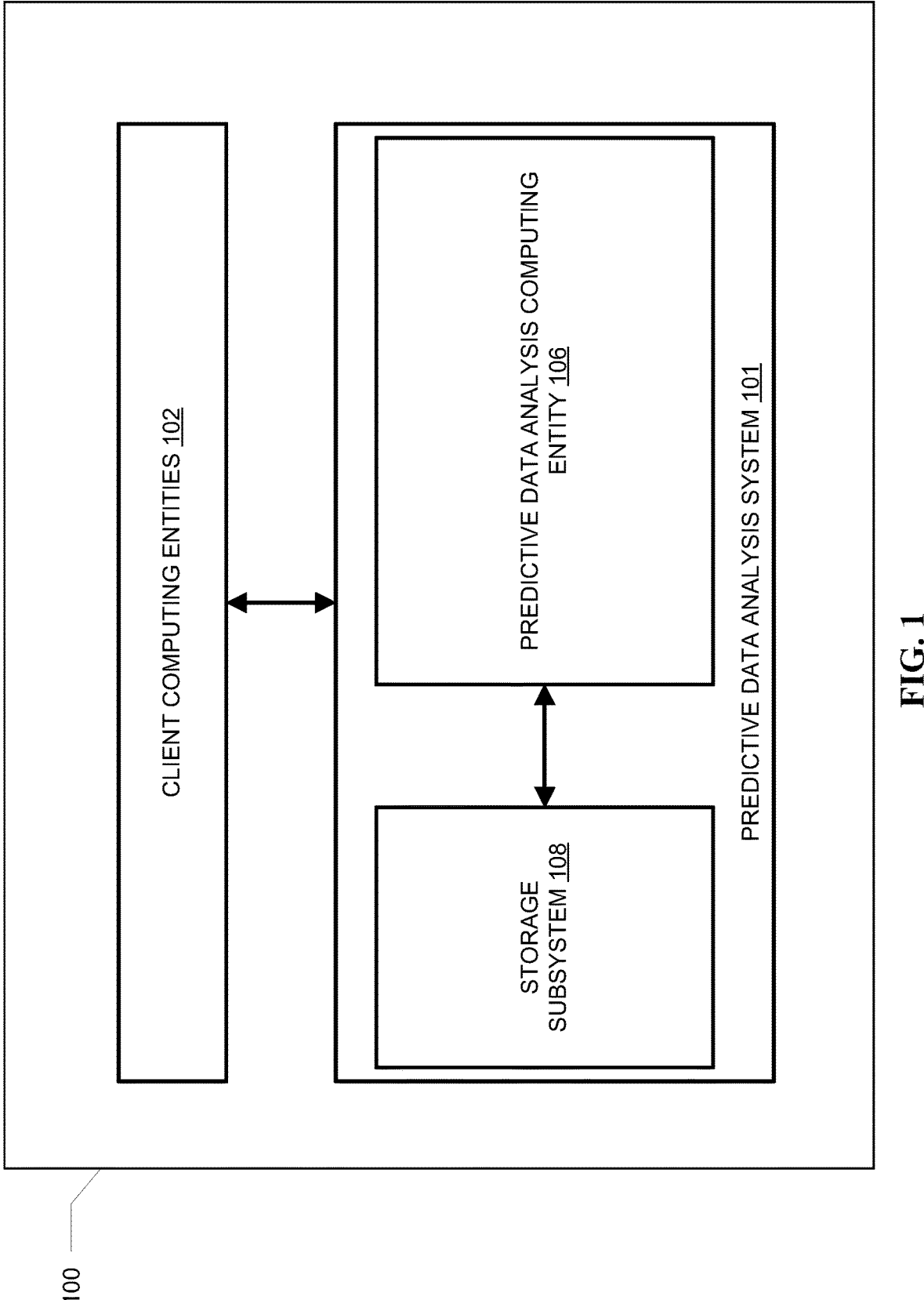
FIG. 1 provides an example overview of an architecture that may be used to practice embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that include articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component including assembly language instructions may require conversion into executable machine code by an assembler prior to execution by the hardware architecture and/or platform. Another example programming language may be a higher-level programming language that may be portable across multiple architectures. A software component including higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component including instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that includes combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 provides an example overview of architecture 100 that may be used to practice embodiments of the present disclosure. The architecture 100 includes a predictive data analysis system 101 configured to receive predictive data analysis requests from client computing entities 102, process the predictive data analysis requests to generate predictions, provide the generated predictions to the client computing entities 102, and automatically initiate performance of prediction-based actions based on in part on the generated predictions.

An example of a prediction-based action that may be performed using the predictive data analysis system 101 includes a response to receiving a request for generating a plurality of data object cohorts from a dataset and generating impact measures for the data object cohorts and/or particular data objects of one or more data object cohorts. The response may include providing the data object cohorts and object impact measures to a sender of the request (e.g., a client computing entity), performing a resource-based distribution action (e.g., generating an optimal parameter occurrence set for distributing parameter occurrences of a resource to one or more data objects), generating a diagnostic report, generating action scripts, generating alerts or messages, and generating one or more electronic communications based on object impact measures for each data object cohort and/or individual data objects.

In accordance with various embodiments of the present disclosure, a machine learning framework for estimating impact measures for a predictive label may be configured to generate cohorts of data objects that are associated or unassociated with the predictive label. In some embodiments, the machine learning framework generates, for each cohort of data objects and/or one or more individual data objects of a cohort, an impact measure that indicates a predicted causal effect on a predictive outcome when a resource is distributed to data objects of the cohort or to an individual data object. In some embodiments, the machine learning framework may include a positive nonlinear causal inference machine learning model that is trained to predict nonlinear causal effects on a predictive outcome when a resource is distributed to data objects that are associated with a predictive label. In some embodiments, the machine learning framework may include a negative nonlinear causal inference machine learning model that is trained to predict nonlinear causal effects on a predictive outcome when a resource is distributed to data objects that are unassociated with the predictive label. In some embodiments, to generate cohorts and impact measures, the machine learning framework utilizes attributes of data objects and knowledge graph data, such as directed acyclic graph (DAG) data. This technique may lead to higher success of resource distribution operations as needed for certain data objects or cohorts of data objects by indicating data objects or cohorts of data objects that may experience the greatest benefit of being distributed a resource. In doing so, the techniques described herein improve efficiency and quality-of-service. Accordingly, some of the techniques of the present disclosure improve the computational, storage, and operational efficiency of computational systems.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically initiate performance of prediction-based actions based on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Figure 2:
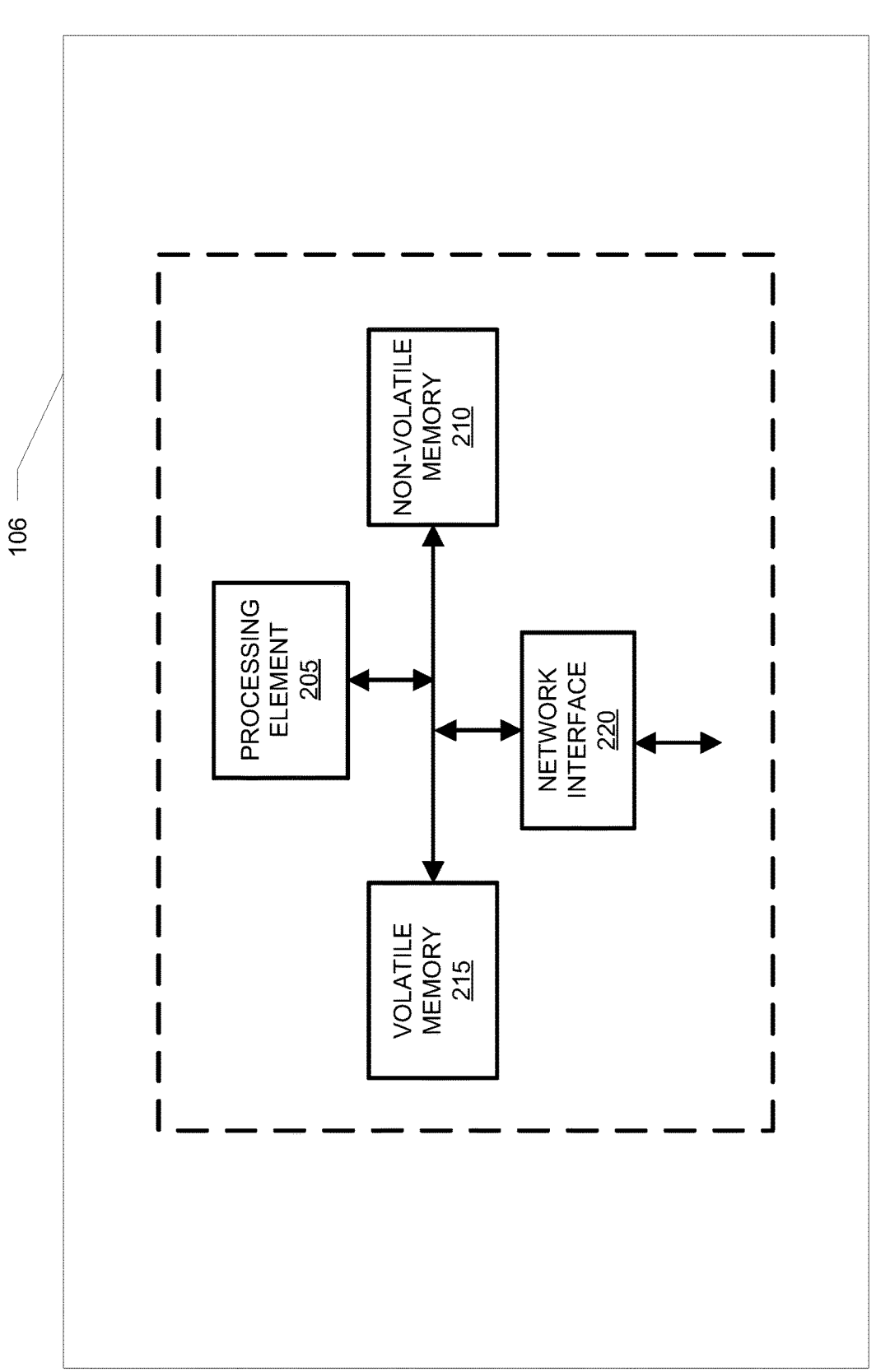
FIG. 2 provides an example predictive data analysis computing entity in accordance with some embodiments discussed herein.

FIG. 2 provides an example predictive data analysis computing entity 106 in accordance with some embodiments discussed herein. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes are performed on data, content, information, and/or similar terms used herein interchangeably.

As indicated, in some embodiments, the predictive data analysis computing entity 106 may also include one or more network interfaces 220 for communicating with various computing entities, such as by communicating data, content, information, and/or similar terms used herein interchangeably that may be transmitted, received, operated on, processed, displayed, stored, and/or the like.

As shown in FIG. 2, in some embodiments, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the predictive data analysis computing entity 106 may further include, or be in communication with, non-volatile media (also referred to as non-volatile storage, memory, memory storage, memory circuitry, and/or similar terms used herein interchangeably). In some embodiments, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the predictive data analysis computing entity 106 is further include, or be in communication with, volatile media (also referred to as volatile storage, memory, memory storage, memory circuitry, and/or similar terms used herein interchangeably). In some embodiments, the volatile storage or memory also includes one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in some embodiments, the predictive data analysis computing entity 106 includes one or more network interfaces 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Figure 3:
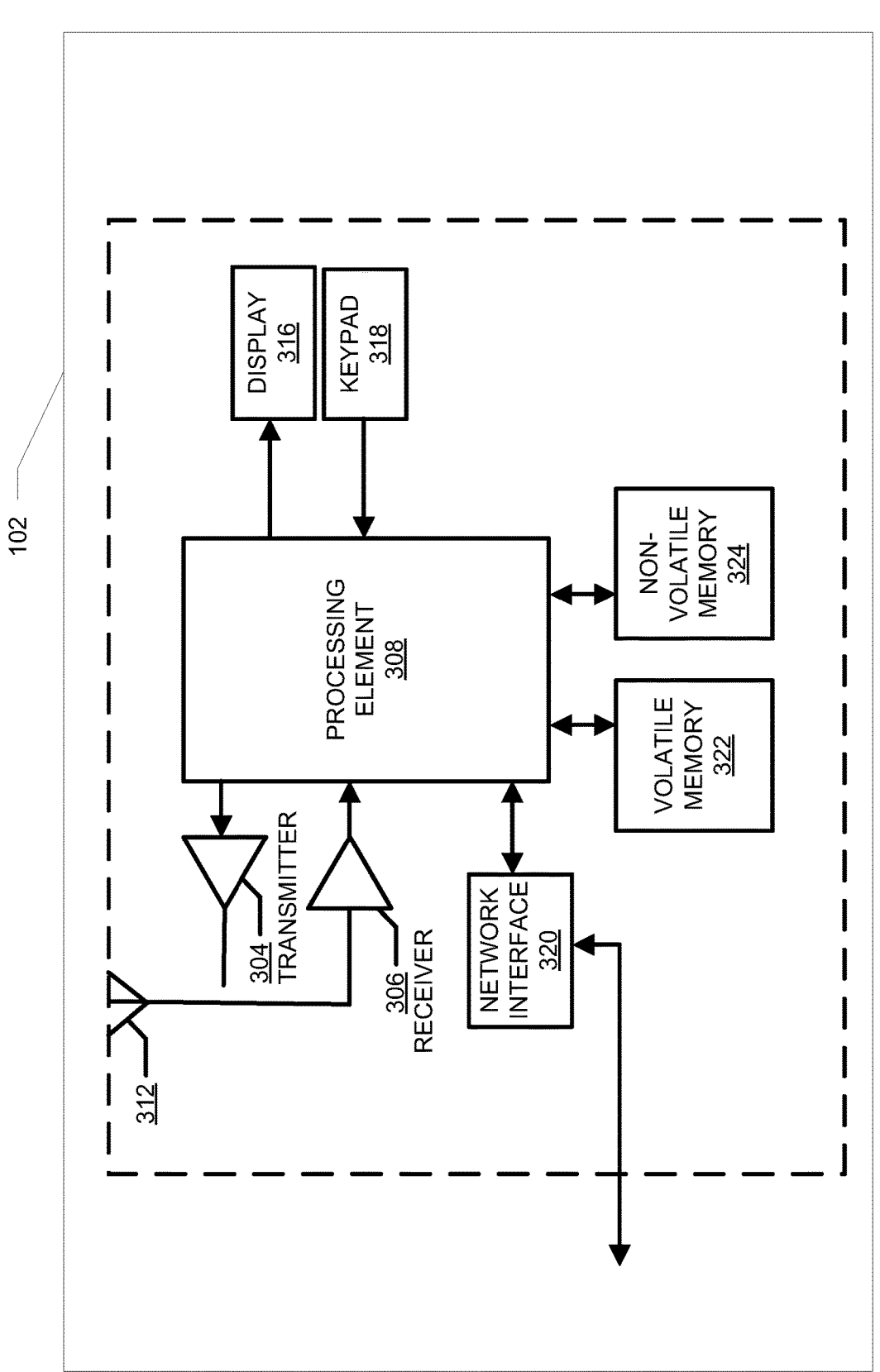
FIG. 3 provides an example client computing entity in accordance with some embodiments discussed herein.

FIG. 3 provides an example client computing entity 102 in accordance with some embodiments discussed herein. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also include a user interface (that may include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface may include any of a number of devices or interfaces allowing the client computing entity 102 to receive data, such as a keypad 318 (hard or soft), a touch display, voice/speech or motion interfaces, gesture recognition sensors, or other input device. In embodiments including a keypad 318, the keypad 318 may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for example purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, a gesture-activated input, and/or the like. In certain embodiments, an AI computing entity may include one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. Examples of Certain Terms

In some embodiments, the term "data object" refers to a data construct that describes an object, article, file, program, service, task, operation, computing, and/or the like unit that receives resources or acts as a resource (generally referred to herewith as distribution of resource), to execute an operation, perform a task, maintain or advance a state, or continue functioning. In some examples, a data object may be a unit of data that is associated with one or more attributes for a recorded entity (e.g., an event, an item, an asset, etc.). The data object may include an input for a prediction model in a prediction domain. In some examples, the data object may depend on the prediction domain. As one example, in a clinical prediction domain, the data object may include a recorded member that is associated with one or more clinical attributes, such as a historical number of clinical interactions provisioned to the member, medical claims, medical labs, medical charts, and demographic information.

In some embodiments, a data object is associated with one or more predictive labels. For example, the data object may be assigned to a predictive label. In addition, or alternatively, a data object may be associated with the predictive label based on one or more attributes of the data object, one or more rules for the predictive label, one or more risk scores for the predictive label, and/or the like. For example, a data object may be determined to be associated (or unassociated) with a predictive label based on applying one or more rules to attributes with which the data object is associated. As another example, a data object may be determined to be at high or low risk of association with a predictive label based on a risk score for the data object, which may be generated using a machine learning prediction model. In some embodiments, one or more resources are distributed to a data object, which may impact a predictive outcome for the data object. For example, in a clinical prediction domain, a data object may represent a member of a healthcare program and a resource distributed to the data object may be the provisioning a clinical interaction for the member. In some examples, some of the predictive modeling techniques of the present disclosure may provide improved techniques for generating cohorts of data objects with respect to a predictive label and generating impact measures for the various cohorts that indicate a predicted change to a predictive outcome for data objects of a respective cohort.

In some embodiments, the term "cohort of data objects" refers to a data construct that describes a group of data objects, such as members, that share a defining characteristic or criteria. In some embodiments, some of the predictive modeling techniques of the present disclosure generate data object cohorts based on a clustering of data objects from a dataset including historical data indicative of attributes of the data objects. In some examples, data object cohorts may be generated based on the attributes of the plurality of data objects. For example, attributes may include, or otherwise indicate, an assignment of a data object to a predictive label. A first cohort of data objects, for example, may include a first subset of a plurality of data objects assigned to the predictive label, whereas a second cohort of data objects may include a second subset of the plurality of data objects not assigned to a predictive label.

In some embodiments, a data object cohort is generated based on application of one or more rules to a plurality of data objects and/or the one or more attributes of the data objects. A rule, for example, may establish one or more criteria for associating a data object with a predictive label. For example, a deterministic rules engine may apply a plurality of rules to one or more attributes associated with a plurality of data objects to generate a plurality of data object cohorts where each cohort includes a subset of the plurality of data objects. A plurality of data object cohorts may include a first cohort of data objects positively associated with a predictive label (e.g., based on the one or more rules as applied to the attributes of the data objects) and a second cohort of data objects unassociated, or negatively associated, with the predictive label.

In some embodiments, data object cohorts are generated based on risk scores for a plurality of data objects and/or one or more attributes of the data objects. A risk score may be associated with a predictive label (e.g., higher risk scores indicating higher risk of association with the predictive label). For example, using attributes of a data object and a machine learning model configured to process the attributes, a risk score may be generated for each of a plurality of data objects, where the risk score indicates a likelihood of the corresponding data object being positively associated with a predictive label. Based on the risk scores, a positive risk-based cohort and a negative risk-based cohort may be generated, where the positive risk-based cohort includes a first subset of the plurality of data objects with a higher predicted risk of association with the predictive label and the negative risk-based cohort includes a second subset of the plurality of data objects with a lower predicted risk of association with the predictive label.

In some embodiments, the term "attribute" refers to any data construct that indicates one or more qualities, conditions, metrics, statuses, or other conditions associated with a particular data object (e.g., historically associated with the data object, currently associated with the data object, associated with the data object in the future, or any combination thereof). In some embodiments, an attribute includes one or more historical predictive outcomes associated with the attribute. In some examples, in a clinical prediction domain, an attribute may include a number of clinical interactions provided to a member of a healthcare program (e.g., a data object) and the attribute may include a historical number of hospitalizations of the member (e.g., a historical predictive outcome). In some examples, in a clinical prediction domain, attributes may include various clinical documentation data associated with the member, such as medical claims, medical labs, medical charts, and demographic information.

In some embodiments, some of the predictive modeling techniques of the present disclosure utilize attributes to generate cohorts of data objects from a plurality of data objects. For example, an attribute may include assignment of a corresponding data object to a predictive label (e.g., or indicate non-assignment to the predictive label). In this example, using the respective attribute for each of a plurality of data objects, a first cohort of data objects and a second cohort of data objects may be generated, where the first cohort of data objects includes a subset of the plurality of data objects assigned to the predictive label (e.g., a positive cohort) and a subset of the plurality of data objects not assigned to the predictive label (e.g., a negative cohort).

In some embodiments, the prediction systems and processes utilize attributes to generate risk scores for indicating likelihood of a data object being associated with a predictive label. For example, a first attribute for a data object may indicate the data object is not assigned to a predictive label. In addition, or alternatively, one or more attributes of a data object may be predictive of a predictive label, such that they may be used with one or more deterministic rules to indicate whether the data object is associated with the predictive label. In some examples, the one or more attributes may be leveraged to generate a risk score. For instance, the one or more attributes may include one or more features considered by a machine learning prediction model that is configured to generate a risk score indicative of a likelihood of whether an object is associated with a predictive label.

In some embodiments, an attribute includes one or more causal variables. As an example, an attribute, or plurality of attributes, may include or otherwise indicate a log of activity, events, diagnosis, conditions, demographics, statistics, actions or procedures, and any other information associated with the one or more data objects. In some embodiments, an attribute is associated with metadata, such as a date and/or time interval. For example, an attribute may include an assignment of a predictive label to a data object and metadata indicative of a date of the assignment. In some examples, an attribute may include statistics and observations associated with condition and behavior of a data object, and metadata for the attribute may indicate one or more dates for when the statistics and observations were generated for or associated with the data object. In some embodiments, some of the predictive modeling techniques of the present disclosure utilize attribute metadata to determine attributes of a data object that contribute or correlate to association of a data object with a predictive label.

For example, in a clinical predictive domain, a member (e.g., data object) may be associated with a diagnosis for a health condition (e.g., predictive label) based on application of one or more deterministic rules to historical medical charts, medical claims, and/or demographic data of the member (e.g., attributes). Some of the predictive modeling techniques of the present disclosure may utilize timestamps (e.g., metadata) to determine a subset of the historical medical charts, medical claims, and/or demographic data that contribute to or correlate to association of the member with the diagnosis. In some examples, in a clinical predictive domain, a member is determined not to be associated with a health condition based on having a low risk score for likelihood of having the health condition. Some of the predictive model techniques of the present disclosure may utilize timestamps to determine a subset of the members historical medical charts, medical claims, and/or demographic data that correlate to a point in time at which the member is associated with the low risk score for having the health condition.

In some embodiments, the attributes (e.g., or historical data indicative thereof) are stored in a database and provided as input to some of the predictive modeling techniques of the present disclosure for generating a causal inference model, for comparing to one or more deterministic rules, and/or for generating one or more risk scores (e.g., using a machine learning prediction model).

In some embodiments, one or more attributes are provided in or indicated by historical data associated with a data object. In some embodiments, as used herein, historical data refers to a data construct that describes a recording of structured and/or unstructured data associated with attributes, such as predictive label assignments, with respect to one or more data objects. In some embodiments, the historical data includes predictive outcomes as a result of one or more attributes. In some embodiments, the attributes include actions, such as assignment of a data object to a predictive label or an amount of a particular resource that was distributed to a data object. In some embodiments, some of the predictive modeling techniques of the present disclosure utilize one or more datasets that include a plurality of data objects and respective attributes for each of the plurality of data objects, or at least a subset thereof. In some embodiments, attributes include data records associated with one or more data objects, such as one or more conditions, observations, or measurements for the one or more data objects. In some examples, in a clinical prediction domain, attributes for a data object may include time series international classification of diseases (ICD) codes, current procedural terminology (CPT) codes, prescription (Rx) codes, logical observation identifiers, names, and codes (LOINC) data, and/or the like, that are associated with the data object.

In some embodiments, the term "predictive label" refers to a data construct for indicating association of a data object with a particular status, state, condition, quality, or other classification. For example, a predictive label may indicate that a data object possesses or is otherwise positively associated with a particular condition. In some embodiments, a predictive label for a data object may be indicated by one or more attributes of the data object. For example, an assignment of a data object a predictive label may be indicated by a particular attribute of the data object (e.g., or value thereof) that corresponds to the predictive label.

In some embodiments, a predictive label is associated with one or more deterministic rules. In some embodiments, some of the predictive modeling techniques of the present disclosure utilize comparisons between the deterministic rule and one or more attributes of a data object to determine if the data object is associated with the corresponding predictive label. In some embodiments, some of the predictive modeling techniques of the present disclosure utilize predictive labels to generate cohorts of data objects from a plurality of data objects. For example, a first cohort of data objects and a second cohort of data objects may be generated from a plurality of data objects based on an association or non-association between each respective data object and the predictive label. In some embodiments, in instances where, based on attributes, deterministic rules, or risk scores, a data object is predicted to be affiliated with a predictive label, said instances are referred to as the data object being "associated with" the predictive label. In some embodiments, in instances where an attribute and/or other historical data indicates that a data object is associated with a predictive label (e.g., without association being further determined based on deterministic rule or risk score), said instances are further referred to as the data object being "assigned to" the predictive label. In some embodiments, some of the predictive modeling techniques of the present disclosure provide improved techniques for estimating causal effects on a predictive outcome for a plurality of data objects respective to a particular predictive label, where at least a subset of the plurality of data objects lack documentation (e.g., an attribute or other historical data) that indicates a formal association, or non-association, of the respective data object with the predictive label.

In some embodiments, the term "positive cohort" refers to a cohort including one or more data objects associated with a predictive label (e.g., based on one or more attributes thereof or comparisons between the attribute and one or more deterministic rules). In some embodiments, the positive cohort includes one or more data objects assigned to the predictive label (e.g., based on a direct indication of an association between the data object and the predictive label in one or more attributes or other historical data corresponding to the data object). In some embodiments, a cohort of data objects assigned to a predictive label is referred to herein as a "label-based positive cohort." In some embodiments, the positive cohort includes one or more data objects determined to be associated with the predictive label based on a comparison between one or more attributes corresponding to the data object and one or more deterministic rules associated with determining association or non-association between a data object and the predictive label. In some embodiments, a cohort of data objects associated with a predictive label based on a comparison to one or more deterministic rules is referred to herein as a "rules-based positive cohort." In some embodiments, a label-based positive cohort is mutually exclusive with a rules-based positive cohort.

In some embodiments, the term "negative cohort" refers to a cohort including one or more data objects not associated with a predictive label (e.g., based on one or more attributes thereof or comparisons between the attribute and one or more deterministic rules). In some embodiments, a negative cohort includes one or more data objects where the attributes, or other historical data, for each respective data object lacks a formal indication of a positive association between the data object and the predictive label. In some embodiments, a negative cohort includes one or more data objects that were determined not be associated with the predictive label based on a comparison between one or more attributes of the data object (e.g., and potentially other historical data) and one or more deterministic rules associated with the predictive label.

In some embodiments, the term "positive risk-based cohort" refers to a cohort including one or more data objects predicted to be associated with a predictive label based on a corresponding risk score for predicting a likelihood of association with the predictive label. In some embodiments, the positive risk-based cohort includes data objects associated with a risk score that satisfies a predetermined threshold for classifying a data object as being associated with the predictive label. In some embodiments, the positive risk-based cohort includes data objects associated with a first classification of risk score, such as a medium predicted risk of association with the predictive label, and a second classification of risk score, such as a high predicted risk of association with the predictive label. For example, the first classification of risk score may be associated with a first predetermined threshold (e.g., a medium-risk threshold) and the second classification of risk score may be associated with a second predetermined risk threshold (e.g., a high-risk threshold) that is greater than the first predetermined risk threshold. In some embodiments, the positive risk-based cohort excludes data objects having risk scores for the predictive label that fail to meet a predetermined threshold. For example, the positive risk-based cohort may exclude data objects for which a predicted risk score is less than a predetermined risk threshold. As another example, the positive risk-based cohort may exclude data objects for which a predicted risk score causes the corresponding data object to be classified as no- or low-risk for association with the predictive label.

In some embodiments, the term "negative risk-based cohort" refers to a cohort including one or more data objects predicted to be unassociated with a predictive label based on a corresponding risk score for predicting a likelihood of association with the predictive label. In some embodiments, the negative risk-based cohort includes data objects associated with a risk score that (i) satisfies a predetermined threshold for classifying a data object as being unassociated with the predictive label, or (ii) fails to satisfy a predetermined threshold for classifying a data object as being associated with the predictive label. In some embodiments, the negative risk-based cohort includes data objects associated with a particular classification of risk score, such as a no- or low-predicted risk of association with the predictive label. In some embodiments, the negative risk-based cohort excludes data objects having risk scores for a predictive label that meet a predetermined threshold for classifying a data object as being associated with the predictive label. For example, the negative risk-based cohort may exclude data objects for which a predicted risk score meets a predetermined risk threshold.

In some embodiments, the term "risk score" refers to a measure of likelihood that a data object is associated with a predictive label. For example, a risk score may be a scaling value for predicting a level of likelihood that a data object is associated with a predictive label. In some examples, the risk score may be a probability value that ranges from 0 to 1.0, where 0 indicates a lowest level of probability that a data object is associated with a predictive label and 1.0 indicates a highest level of probability that a data object is associated with the predictive label. One or threshold may be used to classify a data object based on a risk score. For example, a risk score may be compared to a risk threshold of 0.2, and, in response to the risk score being less than 0.2, a corresponding data object may be classified as having a low risk of association with a predictive label. In a particular example, in a clinical prediction domain, a risk score indicates a level of likelihood of a healthcare program member being diagnosed with a particular health condition.

In some embodiments, the term "causal relationship" refers to a linear or nonlinear relationship between one or more causal effect variables, such as attributes of a data object, and a causal effect, such as an impact on a predictive outcome for a data object. The causal relationship may include one or more predicted causal effect values for a value of a causal variable on a predictive outcome, or one or more aspects thereof, such as a predictive cost of the predictive outcome. In some embodiments, some of the predictive modeling techniques of the present disclosure utilize causal relationships to generate impact measures for predicting the impact of a predictive label and/or a resource on a predictive outcome for a data object or cohort of data objects, such as a label-based positive cohort, a rules-based positive cohort, or a negative risk-based cohort. In some embodiments, one or more causal relationships are utilized in a causal inference model for generating impact measures (e.g., estimates of causal effect on a predictive outcome). In some embodiments, some of the predictive modeling techniques of the present disclosure utilize causal relationships and causal inference models to generate impact measures for one or more data object cohorts or individual data objects.

In some embodiments, the term "predictive outcome" refers to a data construct that describes a dependent variable that may be varied based on causal variable values selected for one or more causal variables, such as attributes of a data object. For example, a predictive outcome may represent a desired state or condition of a data object, such as a predictive cost associated with distributing a resource to the data object. In some embodiments, a predictive outcome corresponds to a causal effect of one or more causal variables, which may be one or more attributes of one or data objects. In some examples, a predictive outcome may include a level of resource utilization for a cohort of data objects or a predictive cost of providing one or more resources to the cohort of data objects. In a particular example, in a clinical prediction domain, a predictive outcome may be a number of hospital admissions of one or more members of a healthcare program (e.g., potentially within any suitable time period, such as one year, six months, four weeks, or any suitable interval).

In some embodiments, the term "impact measure" refers to a measure of causal effect for one or more causal variables on a predictive outcome. For example, an impact measure for a particular data object may indicate a predicted change to a predictive outcome for the particular data object. In some examples, an impact measure may be a predicted change to a level of resource utilization for a cohort of data objects. In a particular example, in a clinical prediction domain, an impact measure may be a predicted change to a number of hospital admissions of one or more members of a healthcare program. In some embodiments, the impact measure is generated using a causal inference model.

In some embodiments, one or more different impact measures may be generated for different cohorts of objects that are organized based on a predictive label. For example, a positive impact measure may be generated for a positive cohort that is associated with the predictive label. The positive impact measure may be generated using a positive causal inference model and based on attributes of the one or more data objects of the positive cohort. The positive impact measure may be a predicted causal effect on a predictive outcome when a resource is distributed to the positive cohort. In some examples, a label-based positive cohort impact measure may be generated for a label-based positive cohort using a positive causal inference model and based on attributes of the one or more data objects of the label-based positive cohort. The label-based positive cohort impact measure may be a predicted causal effect on a predictive outcome when a resource is distributed to the label-based positive cohort. In some examples, a positive impact measure may be generated for a rules-based positive cohort using a positive causal inference model and based on attributes of the one or more data objects of the rules-based positive cohort. The rules-based positive cohort impact measure may be a predicted causal effect on a predictive outcome when a resource is distributed to the rules-based positive cohort.

In some examples, a negative risk-based impact measure may be generated for a negative risk-based cohort using a negative causal inference model and based on attributes of the one or more data objects of the negative risk-based cohort. The negative risk-based impact measure may be a predicted causal effect on a predictive outcome when a resource is distributed to the negative risk-based cohort. In some examples, an object impact measure may be generated for a data object of a positive risk-based cohort based on a risk score of the data object, one or more positive impact measures, and a negative risk-based impact measure. The object impact measure may be a predicted causal effect on a predictive outcome when a resource is distributed to the data object of the positive risk-based cohort.

In some embodiments, the term "causal inference model" refers to a data construct that describes one or more causal relationships. For example, the causal inference model may refer to, or include, parameters, hyperparameters, and/or defined operations of a machine learning model that is configured to generate one or more nonlinear causal effect predictions of one or more causal variables on a predictive outcome associated with a data object based on historical data, such as attributes of one or more data objects, and knowledge graph data. In some examples, in a clinical prediction domain, a causal inference model generates a causal effect on a predictive outcome when one or more members of a healthcare program are distributed an additional clinical interaction. The causal effect on the predictive outcome may be a predicted reduction in hospitalizations of the one or more members or a predictive cost of providing the healthcare program to the one or more members.

In some embodiments, a causal inference model is based on a predictive label. For instance, a positive causal inference model may be used to generate impact measures respective to data objects, or cohorts thereof, that are associated with a predictive label. In addition, or alternatively, a negative causal inference model, different from the positive causal inference model, may be used to generate impact measures respective to data objects that are not associated with a predictive label (e.g., based on lacking an attribute assigning the data object to the predictive label, based on a comparison between deterministic rules and attributes of the data object, and/or based on the data object having a low risk score for association with the predictive label). In some embodiments, some predictive modeling techniques of the present disclosure use a positive causal inference model to generate a positive impact measure for a positive cohort. The positive causal inference model may be configured to generate impact measures respective to data objects, or cohorts thereof, that are associated with a predictive label. In some embodiments, some predictive modeling techniques of the present disclosure use a negative causal inference model to generate a negative impact measure for a negative cohort. The negative causal inference model may be configured to generate impact measures respective to data objects that are not associated with a predictive label.

In some embodiments, a positive causal inference model is associated with first causal knowledge graph data and a negative causal inference model is associated with second causal knowledge graph data that differs from the first causal knowledge graph data. In some embodiments, the first causal knowledge graph data includes causal relationships and/or corresponding assumptions that are associated with data objects positively associated with the predictive label. In some embodiments, the second causal knowledge graph data includes causal relationships and/or corresponding assumptions associated with data objects that are not associated with the predictive label. In addition, or alternatively, the second causal knowledge graph may include generalized causal relationships for estimating causal effect of one or more attributes on a predictive outcome for a data object.

The first causal knowledge graph data may include a first directed acyclic graph (DAG). For example, a positive causal inference model may be associated with first causal knowledge graph data including a first directed acyclic graph (DAG) that is indictive of one or more causal relationships between the one or more attributes and a predictive outcome for data objects associated with a predictive label. The second causal knowledge graph data may include a second DAG. For example, a negative causal inference model may be associated with second causal knowledge graph data including a second DAG that is indicative of one or causal relationships between the one or more attributes and a predictive outcome for data objects not associated with the predictive label. In some embodiments, the causal inference model includes one or more supervised machine learning regression models, such as a non-parametric double machine learning model or a non-parametric double/debiased machine learning model.

In some embodiments, the term "supervised machine learning regression model" refers to a machine learning model configured to model a relationship between one or more independent variables (e.g., causal variables, such as attributes of a data object or actions, including distribution of a resource to a data object) and a dependent variable (e.g., predictive outcome for one or more data objects) and generate an impact measure based on the modeled relationship. In some embodiments, a supervised machine learning regression model is a double and/or debiased machine learning model configured to predict one or more causal effects on a predictive outcome. In some examples, in a clinical prediction domain, a supervised machine learning regression model is configured to predict a reduction in hospital admissions (e.g., dependent variable) in response to an additional clinical interaction for one or more members of a healthcare program (e.g., causal variable).

In some embodiments, a supervised machine learning regression model is configured to predict a linear or non-linear effect of causal variables (e.g., attributes of one or more data objects, potentially including associated historical outcomes) on a predictive outcome for members of a selected data object cohort over a period of time (e.g., 1 month, 1 year, or any suitable period). The causal variables may be continuous variables or Boolean variables. In some examples, a supervised machine learning regression model may be configured to generate a prediction of a continuous value that forecasts a trend by generating a causal inference model associated with a plurality of predictive outcome values (e.g., absolute values, deltas, or other suitable statistical measures of predictive outcome) and a plurality of causal variable values (e.g., attributes of one or more data objects and/or actions, such as distributing a resource to a data object). In some embodiments, the generated causal inference model includes a best-fit curve between data values of a plot between the plurality of outcome values and the plurality of causal variable values of one or more causal variables. In some embodiments, some of the predictive modeling techniques of the present disclosure use the generated causal inference model to generate impact measures for one or more data objects, where the impact measure indicates a predicted change to a predictive outcome for the one or more data objects.

In some embodiments, the supervised machine learning regression model refers to a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. In some examples, the supervised machine learning regression model may be configured, trained, and/or the like to generate an impact measure that is indicative of a predicted causal effect for a value of a causal variable on a predictive outcome. For example, the supervised machine learning regression model may be configured to process attributes of one or more data objects and a simulated distribution of an additional resource to the data object to generate an impact measure indictive of a causal effect of distributing the additional resource on a predictive outcome associated with the data object. The supervised machine learning regression model may include one or more of any type of machine learning model or artificial intelligence model including one or more supervised, semi-supervised, reinforcement learning models, and/or the like. In some examples, the supervised machine learning regression model may include multiple models configured to perform one or more different stages of a prediction process.

In some embodiments, the supervised machine learning regression model includes a non-parametric double machine learning model. By way of example, the supervised machine learning model may include one or more non-parametric double machine learning models, such as a non-parametric double/debiased machine learning model, causal forest model, linear double model, sparse linear model, partially linear regression model, difference-in-differences model, Lipschitz regression model, deep autoregressive model, and/or the like. By way of example, the supervised machine learning regression model may include a non-parametric double/debiased machine learning model that is previously trained using one or more training datasets, one or more validation datasets, and one or more supervised machine learning techniques to process attributes of a data object and generate an estimated impact measure (e.g., causal effect) of a causal variable on a predictive outcome of interest. For example, in a clinical prediction domain, the non-parametric double/debiased machine learning model may be previously trained to process attributes of one or more healthcare program members and generate an estimated impact measure of distributing an additional clinical interaction to the healthcare program member on a predicted number of member hospitalizations, or a reduction of the predicted number of hospitalizations. In some embodiments, the supervised machine learning regression model is previously trained using one or more training datasets and/or validation datasets that include time series historical attributes of data objects and known predictive labels of the data objects. In some examples, in a clinical prediction domain, a training dataset and/or validation dataset may include historical clinical outcomes for a plurality of human subjects, historical clinical events for the human subjects (e.g., clinical interactions, hospitalizations, etc.), historical disease diagnoses for the human subjects (e.g., hierarchical condition categories (HCCs), and time series international classification of diseases (ICD) codes, current procedural terminology (CPT) codes, prescription (Rx) codes, logical observation identifiers, names, and codes (LOINC) data for the human subjects.

In some embodiments, the term "knowledge graph" refers to a data construct that describes expert knowledge data including one or more relationships between various causal variables (e.g., attributes of one or more data objects), actions (e.g., distribution of a resource to one or more data objects), and predictive outcomes. For example, a knowledge graph may include a directed acyclic graph (DAG) data object that is representative of a causal diagram including assumptions, such as, for example, variables to control for (e.g., accounting for extraneous or non-causal variables), and relationships (e.g., directed) between different causal variables (e.g., independent variables), confounders, and outcomes (e.g., dependent variables). Data associated with a knowledge graph may be referred to as "knowledge graph data." In some embodiments, knowledge graph data is stored on one or more databases and retrieved as input to a causal inference model to impart expert knowledge about relationships between different data points. In some embodiments, a knowledge graph includes directionality and/or monotonicity of how variable 'X' causes variable 'Y' (and not vice versa), of how variable 'Z' depends on variable 'X' but not on variable 'Y,' of how variable 'W' causes variables 'Z' and 'Y' but not variable 'X.'

In some embodiments, the term "deterministic rule" refers to one or more data constructs that describe, define, or otherwise configure a policy, threshold, conditional structure, or other criteria for determining an association, or non-association, between a data object and a predictive label. For example, a deterministic rule may indicate that a data object is positively associated with a predictive label if one or more attributes are affiliated with the data object and/or demonstrate a particular value. In some embodiments, some of the predictive modeling techniques of the present disclosure utilize a deterministic rules engine configured to (i) compare attributes (and potentially other data) of a data object to one or more deterministic rules corresponding to a predictive label, and (ii) determine whether the data object is associated with the predictive label based on the comparison. In some examples, in a clinical prediction domain, a first deterministic rule for diagnosing diabetes includes an average blood glucose level of greater than or equal to 6.5%, a second deterministic rule includes a fasting plasma glucose (FPG) level of greater than or equal to 126 mg/dl, and a third deterministic rule includes an oral glucose tolerance test (OGTT) test of greater than or equal to 200 mg/dl. In some examples, in a clinical prediction domain, a first deterministic rule for diagnosing dementia includes observation of memory impairment, a second deterministic rule includes identification of at least one of aphasia, apraxia, agnosia, or disturbance in executive function, and a third deterministic rule includes observation that the observed cognitive deficits do not occur exclusively during the course of delirium. In some examples, in a clinical prediction domain, the deterministic rule includes one or more of international classification of diseases (ICD) codes, current procedural terminology (CPT) codes, prescription (Rx) codes, and logical observation identifiers, names, and codes (LOINC) data associated with positive diagnosis of a particular disease, disorder, or condition.

In some embodiments, the term "machine learning prediction model" refers to a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. In some examples, the machine learning prediction model may be configured, trained, and/or the like to generate a risk score that is indicative of a likelihood that a data object is associated with a predictive label. For example, the machine learning prediction model may be configured to process attributes of a data object to generate one or more probabilistic outputs indicative of the likelihood that the data object is associated with a predictive label. The machine learning prediction model may include one or more of any type of machine learning model or artificial intelligence model including one or more supervised, unsupervised, semi-supervised, reinforcement learning models, and/or the like. In some examples, the machine learning prediction model may include multiple models configured to perform one or more different stages of a prediction process. In some embodiments, the machine learning prediction model includes a reverse time attention mechanism architecture.

In some embodiments, the machine learning prediction model includes a neural network. By way of example, the machine learning prediction model may include one or more neural networks, such as a perceptron, feed forward network, radial basis network, recurrent neural network, bi-directional long/short term memory (LSTM) network, gate recurrent unit, deep belief network, deep convolution network, generative adversarial network, liquid state machine, extreme learning machine, echo state network, deep residual network, support vector machine, and/or the like. By way of example, the machine learning prediction model may include a bi-directional LSTM neural network that is previously trained using one or more training datasets, one or more validation datasets, and one or more supervised machine learning techniques to process attributes of a data object and generate at least one prediction for the data object that is indicative of a likelihood of the data object being associated with a predictive label. In some embodiments, the machine learning prediction model is previously trained using one or more training datasets and/or validation datasets that include time series historical attributes of data objects and known predictive labels of the data objects. In some examples, in a clinical prediction domain, a training dataset and/or validation dataset may include historical disease diagnoses for a plurality of human subjects and time series international classification of diseases (ICD) codes, current procedural terminology (CPT) codes, prescription (Rx) codes, logical observation identifiers, names, and codes (LOINC) data for the human subjects.

In some embodiments, the term "resource" refers to a data construct that describes a physical or virtual component of limited availability, such as within or may be provided by a computer system. For example, connected devices and system components may be accessed as resources. In some embodiments, virtual resources include files, network connections, and/or memory areas. Additional examples of resources may include, but are not limited to, computation time, a number of steps necessary to solve a problem, processes, actions, tasks, services, and memory space, such as an amount of storage needed while solving the problem. In some examples, in a clinical prediction domain, a resource is a clinical interaction between a member of a healthcare program and a healthcare entity, such as an in-office clinical visit, at-home clinical visit, telehealth appointment, automated health screening, or prescription review. In some embodiments, a resource is associated with a stock or supply of money, materials, staff, support, and other assets that may be drawn on by a computing system. In some embodiments, a provisioning of a resource to a data object or cohort of data objects, is referred to as a "distribution" of the resource to the data object or cohort.

IV. Overview and Technical Improvements

Some embodiments of the present disclosure present improved techniques and processes for generating cohorts of data objects respective to association with a predictive label and generating impact measures for the cohorts respective to a predictive outcome when a resource is distributed to the corresponding cohort, or a particular data object thereof. Some embodiments of the predictive modeling techniques of the present disclosure improve upon traditional prediction techniques in complex prediction domains. Complex prediction domains, such as clinical domains, are associated with incomplete and inaccurate documentations of data object attributes, which may reduce accuracy of predictive labels assigned to data objects. This may further reduce accuracy of causal effect predictions that are based on the predictive labels. While attributes of some data objects may include complete and accurate documentation as to association of the data object with a predictive label, attributes of other data objects may be inaccurate or undocumented. The association of a data object with a predictive label may influence prediction of causal effects on a predictive outcome when a resource is distributed to the data object. For example, the accuracy of a predictive causal effect on a predictive outcome for a cohort of data objects determined to be associated with a predictive label may be reduced in instances where one or more data objects are incorrectly included in the cohort based on an inaccurate or incomplete documentation of attributes of the data object.

In some examples, in a clinical prediction domain, distribution of clinical resources, such as clinical interactions, to members of a healthcare program may be based on a predicted level of benefit to the particular member, a cohort of members of the healthcare program, and/or the healthcare program overall as a result of the distribution of the clinical resource. The predicted level of benefit (e.g., causal benefit) may be based on whether the member suffers from one or more health conditions. However, health conditions for one or more members may be undiagnosed or undocumented. For example, both a clinician and a member may be unaware that the member suffers from diabetes, the diagnosis and/or treatment of which may impact a predicted level of benefit when an additional clinical interaction is distributed to the member. Such omission and/or oversight of diagnosis for a health condition may reduce accuracy of causal benefit predictions for all members of the healthcare program. Traditional approaches for causal effect prediction may incorrectly assume that information upon which predictions are based is accurate and complete. For example, such approaches may incorrectly assume that associations between data objects and a predictive label are accurately and fully documented, resulting in reduction of prediction accuracy when such associations are unaccounted for or mischaracterized. Accordingly, there exists a need to identify and account for undocumented and/or undetected relationships of data objects to predictive labels when generating causal effect predictions.

Some of the techniques of the present disclosure address such technical challenges by providing and applying deterministic rules and machine learning techniques for determining the association of a data object with a predictive label in instances of inaccurate or incomplete documentation of attributes of the data object. As a result, the some of the techniques of the present disclosure may improve accuracy of generating cohorts of data objects from a plurality of data objects respective to a predictive label, which may improve accuracy of causal effect predictions for the cohort of data objects respective to a predictive outcome and, thereby, improve effectiveness and efficiency of resource distribution to the cohorts of data objects.

Various embodiments of the present disclosure make important technical contributions to improving distribution of limited resources and determining association of a data object with a predictive label in instances of incomplete or inaccurate records of data object attributes. In particular, various embodiments of the present disclosure include systems and methods for (1) generating a plurality of data object cohorts from a dataset respective to association or non-association of each of a plurality data object with a predictive label, and (2) generating, using causal inference models and machine learning prediction models, a cohort impact measure for each data object cohort and object impact measures for a subset of the plurality of data objects, where the impact measure indicates a predictive causal effect on a predictive outcome when a resource is distributed to the data object cohort or an individual data object. In doing so, the techniques described herein improve performance, e.g., resource-to-benefit, outcomes of any given computing system. Accordingly, the techniques described herein improve the computational, storage, and operational efficiency of computational systems.

For example, various embodiments of the present disclosure improve causal effect prediction for distribution of a resource to a plurality of data objects by generating data object cohorts respective to a predictive label and generating impact measures for the data object cohorts, and/or particular data objects, respective to a predictive outcome. As described herein, data object cohort generation may be performed based on attributes of data objects that may be inaccurate or incomplete. This may ultimately result in incorrect determinations of the data object's association, or non-association, with a predictive label and lead to misleading causal effect predictions. As such, there exists an unmet need to (i) account for inaccurate or incomplete records of data object attributes when generating cohorts of data objects with respect to a predictive label and (ii) generate accurate impact measures for a predictive outcome for data objects associated with inaccurate or incomplete attribute records. As one example, a first cohort of data objects with a documented assignment to a predictive label experience a different degree a causal benefit when allocated a resource as compared to a causal benefit experienced by (i) a second cohort of data objects that lack a documented assignment to the predictive label but meet criteria for being associated with the predictive label, (ii) a third cohort of data objects that lack a documented assignment to the predictive label and fail to meet criteria for being associated with the predictive label but are predicted to be at risk of being associated with the predictive label, and (iii) a fourth cohort of data objects that lack a documented assignment to the predictive label, fail to meet criteria for being associated with the predictive label, and are not predicted to be at risk of being associated with the predictive label. Various embodiments of the present prediction systems and processes are capable of generating such data object cohorts, which may accommodate for instances of incomplete or inaccurate attribute records for one or more data objects and, as a result, improve accuracy of impact measure predictions for the data objects with respect to a predictive outcome and distribution of a resource to the data objects.

Existing techniques may include generating (i) data object cohorts with respect to a predictive label and causal predictions for a predictive outcome of the data object cohorts based on an assumption that data for generating the data object cohorts is complete and accurate. However, such a technique may result in incorrect determinations of association of a data object with the predictive label, which may introduce error into data object cohorts and, as a result, reduce accuracy of causal effect predictions. The reduced accuracy of causal predictions in existing techniques may result in ineffective and inefficient distribution of resources to data object cohorts and/or individual data objects due to inaccurate predictions of how distribution of a resource may be performed to provide the greatest level of causal benefit. Thus, the present disclosure provides improved techniques for resource distribution optimization that may lead to higher success of resource distribution operations as needed for certain data objects. In doing so, some of the techniques of the present disclosure improve the computational, storage, and operational efficiency of traditional predictive computing systems for optimizing resource distribution.

Example inventive and technologically advantageous embodiments of the present disclosure include a deterministic rule- and machine learning prediction-based framework for generating cohorts of data objects from a plurality of data objects with respect to an association of each data object with a predictive label. Further inventive and technologically advantageous embodiments of the present disclosure include a nonlinear causal inference framework specifically configured for predicting causal effects (e.g., impact measures, etc.) on a predictive outcome of interest based on distribution of a resource to each generated cohort of data objects and/or particular data objects thereof.

V. Example System Operations

As indicated, various embodiments of the present disclosure make important technical contributions to improving the estimation of causal effects on a predictive outcome for particular data objects and/or cohorts thereof with respect to a predictive label. In particular, various embodiments of the present disclosure describe techniques for generating (i) cohorts of data objects with respect to a predictive label and (ii) impact measures for the cohorts of data objects, and/or individual data objects thereof, for predicting nonlinear causal effects of a distributed resource on a predictive outcome. In doing so, some of the techniques described in the present disclosure improve performance (e.g., resource-to-benefit, etc.) outcomes of any given computing system. Accordingly, the techniques described herein improve may be practically applied to improve the computational, storage, and operational efficiency of a computing system, in general, and, more specifically, predictive resource distribution computing systems.

Figure 4:
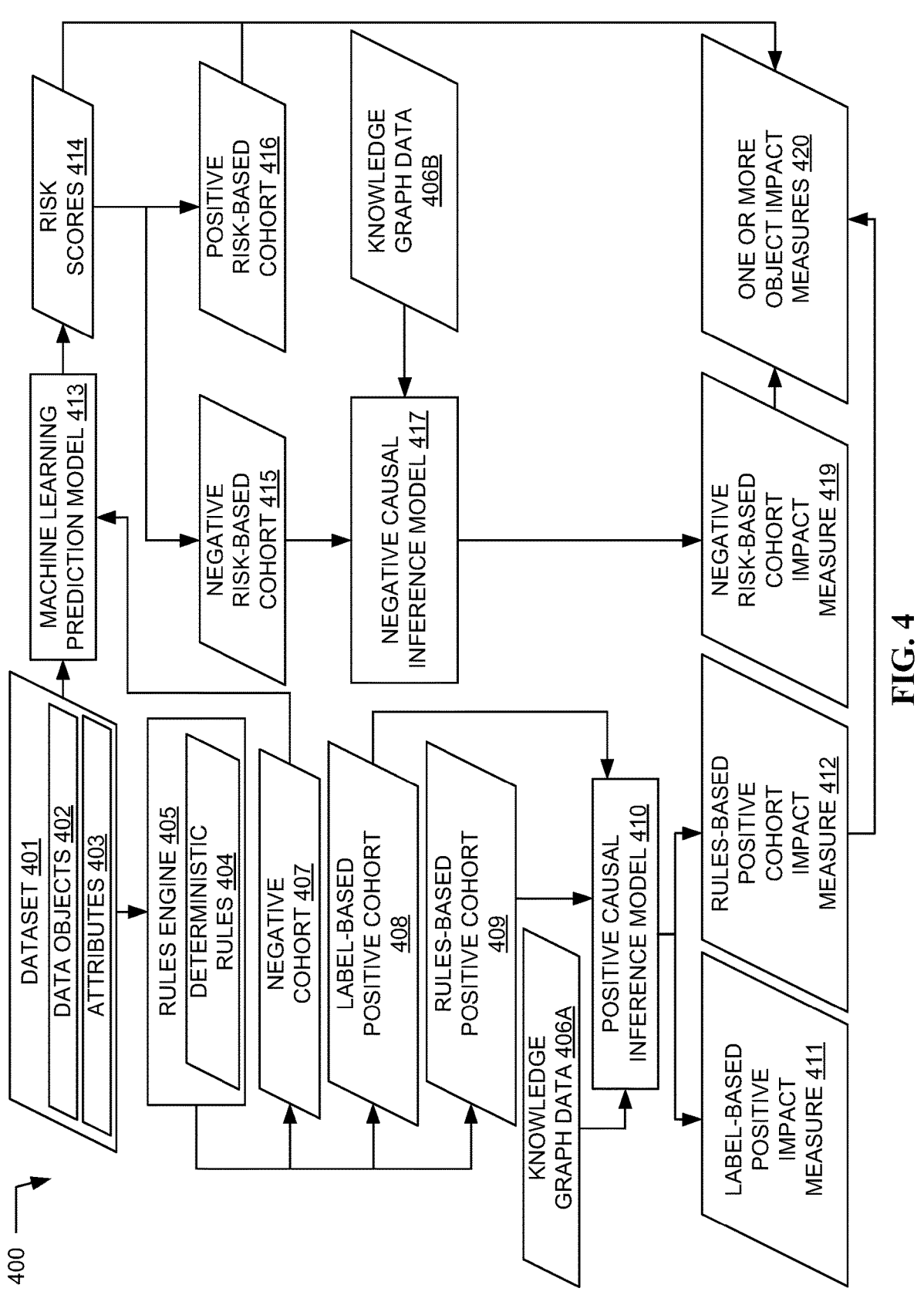
FIG. 4 provides an example dataflow diagram for generating cohorts of data objects and impact measures for the data objects in accordance with some embodiments discussed herein.

FIG. 4 provides an example dataflow diagram 400 for generating cohorts of data objects and impact measures for the data objects in accordance with some embodiments discussed herein. In some embodiments, the techniques of the dataflow diagram 400 are performed by a specially configured predictive data analysis system, such as the predictive data analysis system 101 shown in FIG. 1 and described herein.

Figure 5:
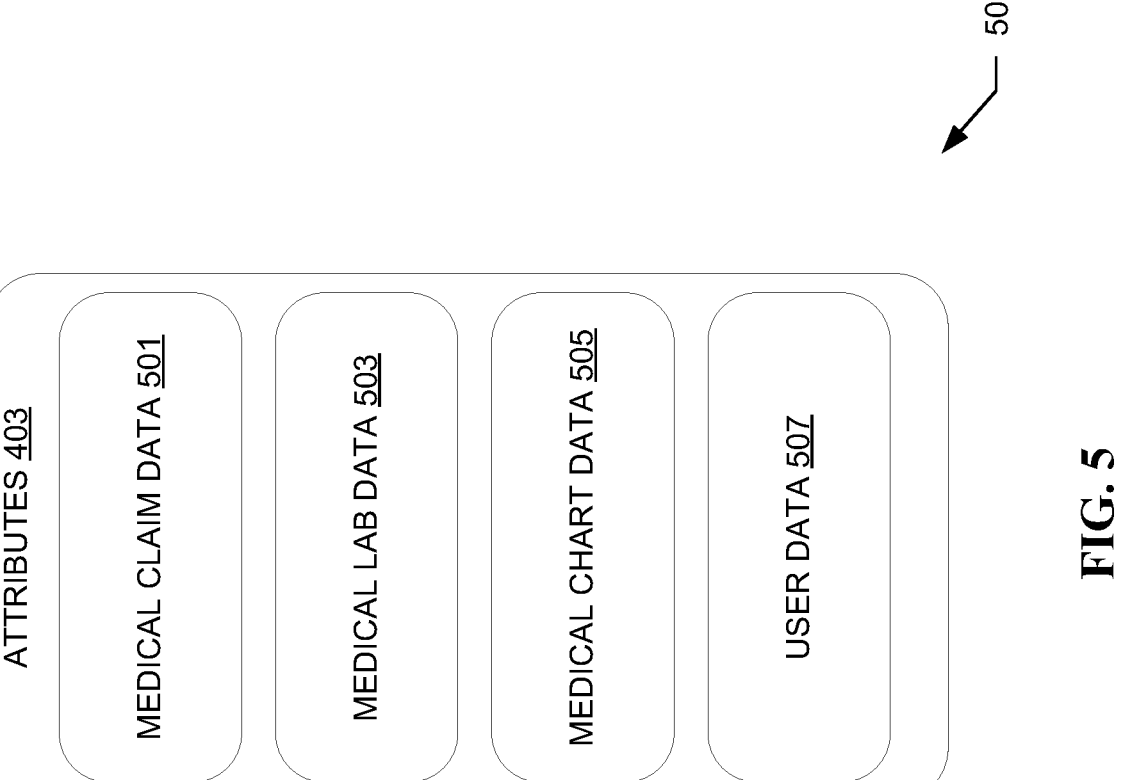
FIG. 5 provides an example architecture of data object attributes in a clinical prediction domain in accordance with some embodiments discussed herein.

In some embodiments, a dataset 401 is received. The dataset 401 may be received from a client computing entity, a data store or other memory of a predictive data analysis system, and/or the like. The dataset 401 may include one or more data objects 402 and attributes 403 associated with the one or more data objects 402. In some embodiments, a data objects 402 is a person or group of persons. As one example, in a clinical prediction domain, the dataset 401 includes a plurality of members of a healthcare program and attributes 403 for the plurality of members. The attributes 403 may include medical claims, medical lab results, medical charts and observations, demographic data (e.g., age, gender, sex, ethnicity), and other social and/or environmental determinants of health. In some embodiments, the data objects 402 or the attributes 403 are (i) received separately from the client computing entity 102, (ii) obtained separately from one or more data stores of a predictive data analysis system, or (iii) received separately from other external systems. In some examples, the data objects 402 are received from a client computing entity associated with a private business entity and the attributes 403 are received from one or more second client computing entities associated with an electronic record management entity. In some, embodiments, a first dataset 401 includes data objects 402 and a second dataset 401 includes attributes 403 associated with the data objects 402 of the first dataset 401. Non-limiting operational examples of attributes 403 in a clinical prediction domain are illustrated in FIG. 5 and described herein.

In some embodiments, the data object 402 is a data construct that describes an object, article, file, program, service, task, operation, computing, and/or the like unit that receives resources or acts as a resource (generally referred to herewith as distribution of resource), to execute an operation, perform a task, maintain or advance a state, or continue functioning. In some examples, a data object 402 may be a unit of data that is associated with one or more attributes for a recorded entity (e.g., an event, an item, an asset, etc.). The data object 402 may include an input for a prediction model in a prediction domain. In some examples, the data object 402 may depend on the prediction domain. As one example, in a clinical prediction domain, the data object 402 may include a recorded member that is associated with one or more clinical attributes, such as a historical number of clinical interactions provisioned to the member, medical claims, medical labs, medical charts, and demographic information.

In some embodiments, a data object 402 is associated with one or more predictive labels. For example, the data object 402 may be assigned to a predictive label. In addition, or alternatively, a data object 402 may be associated with the predictive label based on one or more attributes of the data object 402, one or more rules for the predictive label, one or more risk scores for the predictive label, and/or the like. For example, a data object 402 may be determined to be associated (or unassociated) with a predictive label based on applying one or more rules to attributes with which the data object 402 is associated. As another example, a data object 402 may be determined to be at high or low risk of association with a predictive label based on a risk score for the data object 402, which may be generated using a machine learning prediction model. In some embodiments, one or more resources are distributed to a data object 402, which may impact a predictive outcome for the data object 402. For example, in a clinical prediction domain, a data object 402 may represent a member of a healthcare program and a resource distributed to the data object 402 may be the provisioning a clinical interaction for the member. In some examples, some of the predictive modeling techniques of the present disclosure may provide improved techniques for generating cohorts of data objects 402 with respect to a predictive label and generating impact measures for the various cohorts that indicate a predicted change to a predictive outcome for data objects of a respective cohort.

In some embodiments, the attribute 403 is any data construct that indicates one or more qualities, conditions, metrics, statuses, or other conditions associated with a particular data object 402 (e.g., historically associated with the data object 402, currently associated with the data object 402, associated with the data object 402 in the future, or any combination thereof). In some embodiments, an attribute 403 includes one or more historical predictive outcomes associated with the attribute 403. In some examples, in a clinical prediction domain, an attribute 403 may include a number of clinical interactions provided to a member of a healthcare program (e.g., a data object 402) and the attribute 403 may include a historical number of hospitalizations of the member (e.g., a historical predictive outcome). In some examples, in a clinical prediction domain, attributes 403 may include various clinical documentation data associated with the member, such as medical claims, medical labs, medical charts, and demographic information.

In some embodiments, an attribute 403 includes one or more causal variables. As an example, an attribute 403, or plurality of attributes 403, may include or otherwise indicate a log of activity, events, diagnosis, conditions, demographics, statistics, actions or procedures, and any other information associated with the one or more data objects 402. In some embodiments, an attribute 403 is associated with metadata, such as a date and/or time interval. For example, an attribute 403 may include an assignment of a predictive label to a data object 402 and metadata indicative of a date of the assignment. In some examples, an attribute 403 may include statistics and observations associated with condition and behavior of a data object 402, and metadata for the attribute 403 may indicate one or more dates for when the statistics and observations were generated for or associated with the data object 402. In some embodiments, some of the predictive modeling techniques of the present disclosure utilize attribute metadata to determine attributes 403 of a data object 402 that contribute or correlate to association of a data object 402 with a predictive label. For example, in a clinical predictive domain, a member (e.g., data object 402) may be associated with a diagnosis for a health condition (e.g., predictive label) based on application of one or more deterministic rules to historical medical charts, medical claims, and/or demographic data of the member (e.g., attributes 403). Some of the predictive modeling techniques of the present disclosure may utilize timestamps (e.g., metadata) to determine a subset of the historical medical charts, medical claims, and/or demographic data that contribute to or correlate to association of the member with the diagnosis.

In some embodiments, the attributes 403 (e.g., or historical data indicative thereof) are stored in a database and provided as input to some of the predictive modeling techniques of the present disclosure for generating a causal inference model, for comparing to one or more deterministic rules, and/or for generating one or more risk scores (e.g., using a machine learning prediction model). In some embodiments, one or more attributes 403 are provided in or indicated by historical data associated with a data object 402. In some examples, the dataset 401 includes historical data indicative of the attributes 403 such that the attributes 403 may be extracted or queried from the historical data. In some embodiments, historical data is a data construct that describes a recording of structured and/or unstructured data associated with attributes 403, such as predictive label assignments, with respect to one or more data objects 402. In some embodiments, the historical data includes predictive outcomes as a result of one or more attributes 403. In some embodiments, the attributes 403 include actions, such as assignment of a data object 402 to a predictive label or an amount of a particular resource that was distributed to a data object 402. In some embodiments, some of the predictive modeling techniques of the present disclosure utilize one or more datasets that include a plurality of data objects 402 and respective attributes 403 for each of the plurality of data objects 402, or at least a subset thereof. In some embodiments, attributes 403 include data records associated with one or more data objects 402, such as one or more conditions, observations, or measurements for the one or more data objects 402. In some examples, in a clinical prediction domain, attributes 403 for a data object 402 may include time series international classification of diseases (ICD) codes, current procedural terminology (CPT) codes, prescription (Rx) codes, logical observation identifiers, names, and codes (LOINC) data, and/or the like, that are associated with the data object 402.

In some embodiments, a label-based positive cohort 408 is generated based on the data objects 402 and the attributes 403. In some embodiments, the label-based positive cohort 408 includes one or more data objects 402 that are previously assigned to a predictive label (e.g., based on a direct indication of an association between the data object 402 and the predictive label). For example, one or more attributes 403 may include a predictive label corresponding to the data object 402. For example, in a clinical prediction domain, a predictive label may include a health condition and the label-based positive cohort 408 may include a plurality of data objects 402 that have a formal diagnosis for the health condition (e.g., as indicated in the attributes 403 of the data object 402).

In some embodiments, a plurality of cohorts of the data objects 402 are generated based on a comparison of the respective attributes 403 of each data object 402 to one or more deterministic rules 404. In some embodiments, for each data object 402 a rules engine 405 compares the attributes 403 of the data object 402 to the one or more deterministic rules 404.

In some embodiments, the deterministic rules 404 include one or more data constructs that describe, define, or otherwise configure a policy, threshold, conditional structure, or other criteria for determining an association, or non-association, between a data object 402 and the predictive label. For example, a deterministic rule may indicate that a data object is positively associated with a predictive label if one or more attributes are affiliated with the data object and/or demonstrate a particular value. In some embodiments, some of the predictive modeling techniques of the present disclosure utilize a deterministic rules engine configured to (i) compare attributes (and potentially other data) of a data object to one or more deterministic rules corresponding to a predictive label, and (ii) determine whether the data object is associated with the predictive label based on the comparison. In some examples, in a clinical prediction domain, a first deterministic rule for diagnosing diabetes includes an average blood glucose level of greater than or equal to 6.5%, a second deterministic rule includes a fasting plasma glucose (FPG) level of greater than or equal to 126 mg/dl, and a third deterministic rule includes an oral glucose tolerance test (OGTT) test of greater than or equal to 200 mg/dl. In some examples, in a clinical prediction domain, a first deterministic rule for diagnosing dementia includes observation of memory impairment, a second deterministic rule includes identification of at least one of aphasia, apraxia, agnosia, or disturbance in executive function, and a third deterministic rule includes observation that the observed cognitive deficits do not occur exclusively during the course of delirium. In some examples, in a clinical prediction domain, the deterministic rule includes one or more of international classification of diseases (ICD) codes, current procedural terminology (CPT) codes, prescription (Rx) codes, and logical observation identifiers, names, and codes (LOINC) data associated with positive diagnosis of a particular disease, disorder, or condition.

In some embodiments, based on comparisons between attributes 403 of the data objects 402 and the one or more deterministic rules 404, the label-based positive cohort 408, a negative cohort 407, and a rules-based positive cohort 409 are generated. In some embodiments, the negative cohort 407 includes one or more data objects 402 that are not associated with the predictive label based on one or more attributes 403 and/or a comparison between the attributes 403 and one or more deterministic rules 404. In some embodiments, the negative cohort 407 includes one or more data objects 402 where the attributes 403, or other historical data, for each respective data object 402 lack a formal indication of a positive association between the data object 402 and the predictive label.

In some embodiments, the rules-based positive cohort 409 includes one or more data objects 402 determined to be associated with the predictive label based on a comparison between attributes 403 of the data object and the one or more deterministic rules 404 for determining an association or non-association between a data object and the predictive label. In some embodiments, the label-based positive cohort 408 is mutually exclusive with the rules-based positive cohort 409. In one example, in a clinical prediction domain, the predictive label may be diagnosis of morbid obesity (e.g., hierarchical condition category (HCC) 22), the diagnosis of which may include having a body-mass index (BMI) greater than 40. A deterministic rule 404 for association with HCC 22 may include having a BMI greater than 40. For example, to generate the rules-based positive cohort 409, the rules engine 405 may query the dataset 401 and determine one or more data objects 402 for which corresponding attributes 403 indicate a BMI greater than 40, but do not indicate a formal diagnosis for HCC 22.

In some embodiments, a positive causal inference model 410 is obtained. The positive causal inference model 410 may be generated and/or received based on model data. The model data may define a nonlinear causal inference model indicative of a causal relationship between a causal variable and a predictive outcome of the label-based positive cohort 408 or the rules-based positive cohort 409. In some embodiments, the positive causal inference model 410 is configured to generate an impact measure for a positive cohort (e.g., a label-based positive cohort impact measure 411 and a rules-based positive cohort impact measure 412 shown in FIG. 4 and further described herein) based on attributes 403 of the data objects of the positive cohort. In some embodiments, the positive causal inference model 410 includes one or more supervised machine learning regression models, such as a non-parametric double machine learning model or a non-parametric double/debiased machine learning model, configured to generate causal effect estimations for a predictive outcome.

In some embodiments, the positive causal inference model 410 is a data construct that describes one or more causal relationships. For example, the positive causal inference model 410 include parameters, hyperparameters, and/or defined operations of a machine learning model that is configured to generate one or more nonlinear causal effect predictions of one or more causal variables on a predictive outcome associated with a data object 402. In some examples, in a clinical prediction domain, the positive causal inference model 410 may generate a causal effect on a predictive outcome when one or more members of a healthcare program who are diagnosed with or meet diagnostic criteria for a health condition are distributed an additional clinical interaction. The causal effect on the predictive outcome may be a predicted reduction in hospitalizations of the one or more members or a predictive cost of providing the healthcare program to the one or more members. In some embodiments, the positive causal inference model 410 is based on a predictive label. For instance, the positive causal inference model 410 may be used to generate impact measures respective to data objects 402, or cohorts thereof, that are associated with a predictive label.

Figure 6:
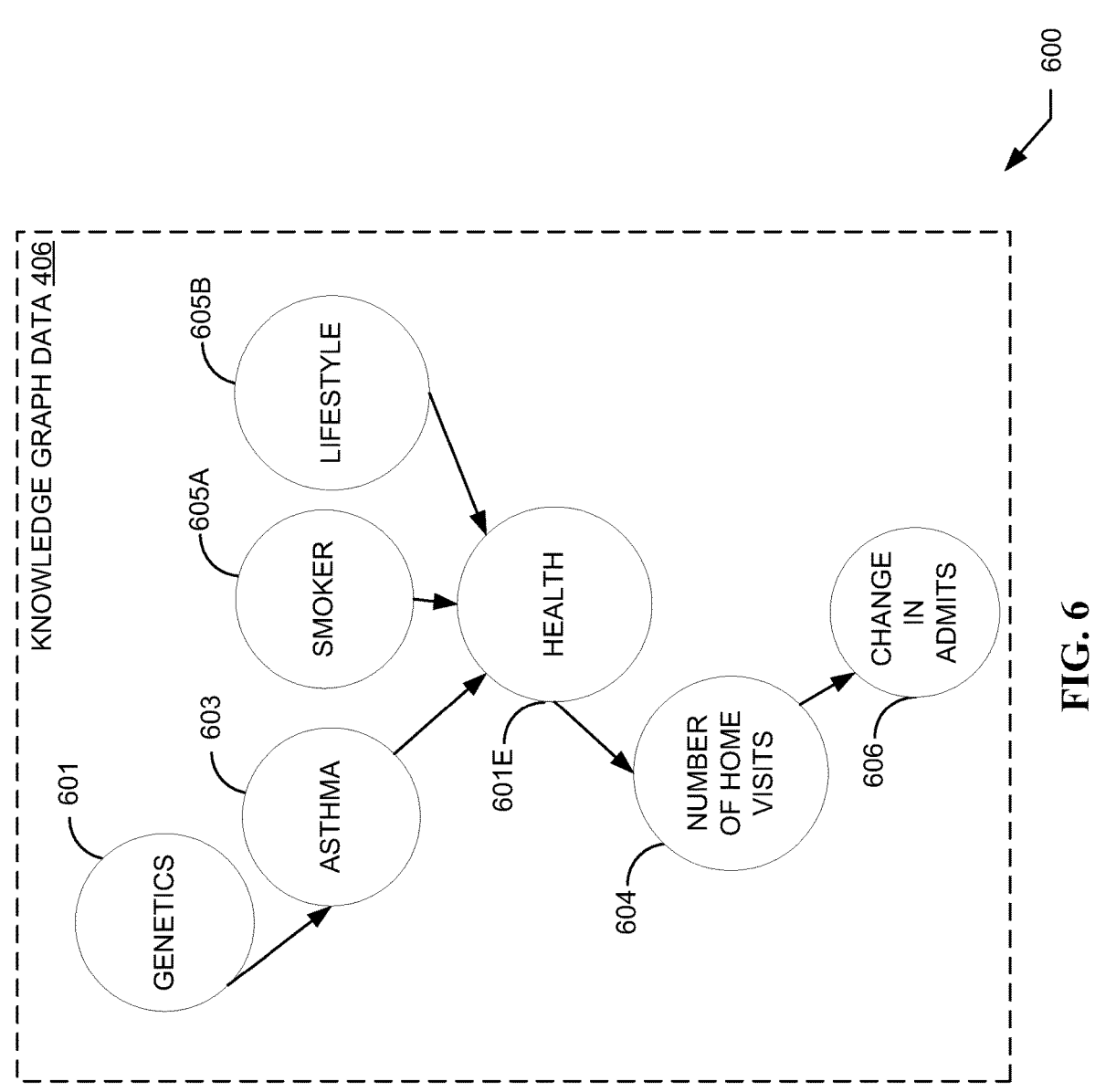
FIG. 6 provides an example architecture of knowledge graph data in a clinical prediction domain in accordance with some embodiments discussed herein.
Figure 7:
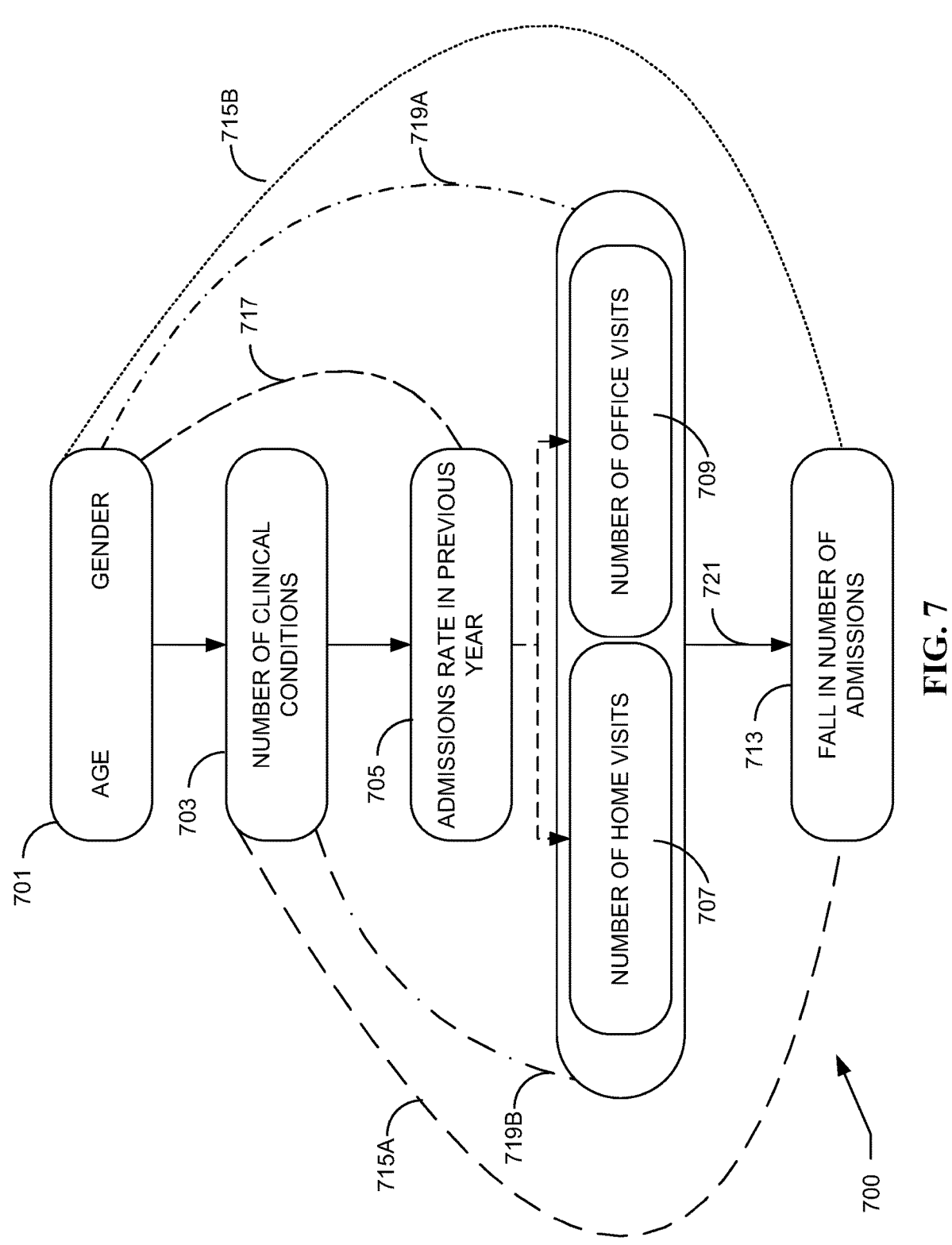
FIG. 7 provides an operational example of a directed acyclic graph in a clinical prediction domain in accordance with some embodiments discussed herein.

In some embodiments, the positive causal inference model 410 is configured to generate impact measures based on knowledge graph data 406A. In some embodiments, the knowledge graph data 406A defines one or more causal relationships and/or corresponding assumptions between a predictive outcome and attributes 403 of the data objects 402 associated with the label-based positive cohort 408 and/or the rules-based positive cohort 409. For example, in a clinical prediction domain, the knowledge graph data 406A may include a directed acyclic graph (DAG) that includes causal relationships and/or assumptions associated with pre-dicting hospital admissions, mortality rates, and/or results of a particular test for healthcare program members that have a formal diagnosis for a particular health condition or meet diagnostic criteria for the particular health condition. In some embodiments, the knowledge graph data 406A is obtained from one or more data stores of a predictive data analysis system and/or received from one or more client computing entities. Non-limiting operational examples of knowledge graph data in a clinical prediction domain are illustrated in FIGS. 6 and 7 as described herein. In some examples, the knowledge graph data 406A may include directionality and/or monotonicity of how variable 'X' causes variable 'Y' (and not vice versa), of how variable 'Z' depends on variable 'X' but not on variable 'Y,' of how variable 'W' causes variables 'Z' and 'Y' but not variable 'X.'

In some embodiments, using the positive causal inference model 410, knowledge graph data 406A, and corresponding attributes 403, a label-based positive cohort impact measure 411 is generated for the label-based positive cohort 408. In some embodiments, the label-based positive cohort impact measure 411 is a predicted causal effect on a predictive outcome when a resource is distributed to data objects 402 of the label-based positive cohort 408. For example, in a clinical prediction domain, the label-based positive cohort impact measure 411 may be an estimated reduction in hospitalizations of members formally diagnosed with a health condition when an additional clinical interaction is distributed to each member.

In some embodiments, using the positive causal inference model 410, knowledge graph data 406A, and corresponding attributes 403, a rules-based positive cohort impact measure 412 is generated for the rules-based positive cohort 409. In some embodiments, the rules-based positive cohort impact measure 412 is a predicted causal effect on a predictive outcome when a resource is distributed to data objects 402 of the rules-based positive cohort 409. For example, in a clinical prediction domain, the rules-based positive cohort impact measure 412 may be an estimated reduction in hospitalizations of members who are not formally diagnosed with a health condition, but who meet clinical criteria for diagnosis of the health condition, when an additional clinical interaction is distributed to each member. In some embodi-ments, attributes used to generate the rules-based positive cohort impact measure 412 are a filtered subset of the attributes 403 that (i) contribute to an association of a data object 402 with the predictive label based on the determin-istic rules 404 and/or (ii) are co-temporal with or post-date the attributes that contribute to the association of the data object 402 with the predictive label based on the determin-istic rules 404. In some embodiments, the filtered subset of the attributes 403 are generated based on attribute metadata, such as timestamps.

In some embodiments, a risk score 414 is generated for each data object 402 of the negative cohort 407 based on the attributes 403 of the data object 402. In some embodiments, the risk score 414 is a probabilistic measure of likelihood that a data object 402 is associated with the predictive label. For example, in a clinical prediction domain, the risk score 414 may be a scaling value for indicating a level of likeli-hood that a member of a healthcare program may be diagnosed with a health condition, such as diabetes, morbid obesity, or asthma. In some embodiments, each risk score

414 is generated using a machine learning prediction model 413. In some embodiments, the machine learning prediction model 413 includes bi-directional long/short term memory (LSTM) network and a reverse time attention mechanism architecture, where the LSTM network is previously trained to predict a likelihood of a data object being associated with the predictive label based on attributes, and potentially other historical data associated with the data object.

In some embodiments, the risk score 414 is a measure of likelihood that a data object 402 is associated with a pre-dictive label. For example, a risk score 414 may be a scaling value for predicting a level of likelihood that a data object 402 is associated with a predictive label. In some examples, the risk score 414 may be a probability value that ranges from 0 to 1.0, where 0 indicates a lowest level of probability that a data object 402 is associated with a predictive label and 1.0 indicates a highest level of probability that a data object 402 is associated with the predictive label. One or threshold may be used to classify a data object 402 based on a risk score. For example, a risk score may be compared to a risk threshold of 0.2, and, in response to the risk score being less than 0.2, a corresponding data object 402 may be classified as having a low risk of association with a predic-tive label. In a particular example, in a clinical prediction domain, a risk score indicates a level of likelihood of a healthcare program member being diagnosed with a particu-lar health condition.

In some embodiments, a negative risk-based cohort 415 and a positive risk-based cohort 416 are generated based on the risk scores 414 of the data objects of the negative cohort 407. In some embodiments, each risk score 414 is compared to a risk threshold. In some, embodiments, in response to the risk score 414 meeting the risk threshold, the corresponding data object 402 is associated with the positive risk-based cohort 416. In some embodiments, in response to the risk score 414 failing to meet the risk threshold, the correspond-ing data object 402 is associated with the negative risk-based cohort 415. In some examples, the risk threshold may be 0.2 and, in response to a data object 402 having a risk score of 0.05, the data object 402 may be associated with the negative risk-based cohort 415 (e.g., indicating the data object 402 is not likely to be associated with the predictive label). In some examples, the risk threshold may be 0.2 and, in response to a data object 402 having a risk score of 0.2 or greater, the data object 402 may be associated with the positive risk-based cohort 416.

In some embodiments, a negative causal inference model 417 is obtained, which may include generating or receiving the negative causal inference model 417 based on model data. The model data may define a nonlinear causal infer-ence model indicative of a causal relationship between a causal variable and a predictive outcome of the negative risk-based cohort 415. In some embodiments, the negative causal inference model is configured to generate an impact measure for a negative cohort (e.g., a negative risk-based cohort 415) based on attributes 403 of the data objects of the negative cohort. In some embodiments, the negative causal inference model 417 includes one or more supervised machine learning regression models, such as a non-para-metric double machine learning model or a non-parametric double/debiased machine learning model, configured to gen-erate causal effect estimations for a predictive outcome.

In some embodiments, the negative causal inference model 417 is a data construct that describes one or more causal relationships. For example, the negative causal infer-ence model 417 include parameters, hyperparameters, and/ or defined operations of a machine learning model that is configured to generate one or more nonlinear causal effect predictions of one or more causal variables on a predictive outcome associated with a data object 402. In some examples, in a clinical prediction domain, the negative causal inference model 417 may generate a causal effect on a predictive outcome when an additional clinical interaction is distributed to one or more members of a healthcare program who are not diagnosed with a health condition, fail to meet diagnostic criteria for the health condition, and are not predicted to be diagnosed with the health condition. The causal effect on the predictive outcome may be a predicted reduction in hospitalizations of the one or more members or a predictive cost of providing the healthcare program to the one or more members. In some embodiments, the negative causal inference model 417 is based on a predictive label. For instance, the negative causal inference model 417 may be used to generate impact measures respective to data objects 402, or cohorts thereof, that are not associated with a predictive label.

In some embodiments, the negative causal inference model 417 is configured to generate impact measures further based on knowledge graph data 406B. In some embodiments, the knowledge graph data 406B defines causal relationships and/or corresponding assumptions between a predictive outcome and attributes 403 of the data objects 402 associated with the negative risk-based cohort 415. For example, in a clinical prediction domain, the knowledge graph data 406B may include a directed acyclic graph (DAG) that includes causal relationships and/or assumptions associated with predicting hospital admissions, mortality rates, or results of a particular test for healthcare program members that do not have a formal diagnosis for a particular health condition, do not meet diagnostic criteria for the particular health condition, and, based on risk score, are not predicted to be positive for diagnosis of the particular health condition. In some embodiments, the knowledge graph data 406B is obtained from one or more data stores of a predictive data analysis system and/or received from one or more client computing entities. In some examples, the knowledge graph data 406B may include directionality and/or monotonicity of how variable 'X' causes variable 'Y' (and not vice versa), of how variable 'Z' depends on variable 'X' but not on variable 'Y,' of how variable 'W' causes variables 'Z' and 'Y' but not variable 'X.'

In some embodiments, the knowledge graph data 406B defines causal relationships and/or corresponding assumptions between a predictive outcome and attributes 403 of data objects 402 that are not associated with a predictive label, whereas the knowledge graph data 406A defines relationships and/or corresponding assumptions between a predictive outcome and attributes 403 of data objects 402 that are associated with the predictive label. For example, in a clinical prediction domain, the knowledge graph data 406B may define causal relationships and/or corresponding assumptions between a predicted number of hospitalizations and various health indicators (e.g., medical charts, medical claims, demographics, etc.,) of healthcare program members that are not diagnosed with diabetes and the knowledge graph data 406A may define causal relationships and/or corresponding assumptions between a predicted number of hospitalizations and various health indicators of healthcare program members that are diagnosed with diabetes, meet clinical criteria for diagnosis of diabetes, and/or are predicted to be diagnosed with diabetes.

In some embodiments, each of the positive causal inference model 410 and the negative causal inference model 417 include a respective supervised machine learning model configured to model a relationship between one or more independent variables (e.g., causal variables, such as attributes of a data object or actions, including distribution of a resource to a data object) and a dependent variable (e.g., predictive outcome for one or more data objects) and generate an impact measure based on the modeled relationship. In some embodiments, a supervised machine learning regression model is a double and/or debiased machine learning model configured to predict one or more causal effects on a predictive outcome. In some examples, in a clinical prediction domain, a supervised machine learning regression model is configured to predict a reduction in hospital admissions (e.g., dependent variable) in response to an additional clinical interaction for one or more members of a healthcare program (e.g., causal variable). In some embodiments, the supervised machine learning regression model is a data entity that describes parameters, hyperparameters, and/or defined operations of a rules-based algorithm and/or machine learning model (e.g., model including at least one or more rule-based layers, one or more layers that depend on trained parameters, coefficients, and/or the like), and/or the like. In some examples, the supervised machine learning regression model may be configured, trained, and/or the like to generate an impact measure that is indicative of a predicted causal effect for a value of a causal variable on a predictive outcome. For example, the supervised machine learning regression model may be configured to process attributes 403 of one or more data objects 402 and a simulated distribution of an additional resource to the data object 402 to generate an impact measure indictive of a causal effect of distributing the additional resource on a predictive outcome associated with the data object 402. In some embodiments, each of the positive causal inference model 410 and the negative causal inference model 417 are previously trained using one or more respectively training datasets and/or validation datasets that include time series historical attributes of data objects and known predictive labels of the data objects. In some examples, in a clinical prediction domain, a training dataset and/or validation dataset may include historical clinical outcomes for a plurality of human subjects, historical clinical events for the human subjects (e.g., clinical interactions, hospitalizations, etc.), historical disease diagnoses for the human subjects (e.g., hierarchical condition categories (HCCs), and time series international classification of diseases (ICD) codes, current procedural terminology (CPT) codes, prescription (Rx) codes, logical observation identifiers, names, and codes (LOINC) data for the human subjects.

In some embodiments, using the negative causal inference model 417, knowledge graph data 406B, and corresponding attributes 403, a negative risk-based cohort impact measure 419 is generated for the negative risk-based cohort 415. In some embodiments, the negative risk-based cohort impact measure 419 is a predicted causal effect on a predictive outcome when a resource is distributed to data objects 402 of the negative risk-based cohort 415. For example, in a clinical prediction domain, the negative risk-based cohort impact measure 419 may be an estimated reduction in hospitalizations when an additional clinical interaction is distributed to each of a plurality of healthcare program members who are not formally diagnosed with a health condition, do not meet clinical criteria for diagnosis of the health condition, and/or are not predicted to be positive for diagnosis of the health condition. In some embodiments, attributes used to generate the negative risk-based cohort impact measure 419 are a filtered subset of the attributes 403 that either (i) contribute to determining the data object 402 is unassociated with the predictive label based on the risk score 414 and/or (ii) are co-temporal with or post-date the attributes that contribute to the determination that the data object 402 is unassociated with the predictive label. In some embodiments, the filtered subset of the attributes 403 are generated based on attribute metadata, such as timestamps.

In some embodiments, one or more object impact measures 420 are generated. In some embodiments, an object impact measure 420 is generated for each data object 402 of the positive risk-based cohort 416. In some embodiments, the object impact measure 420 is a predicted causal effect of a resource on a predictive outcome when the resource is distributed to a data object 402 of the positive risk-based cohort 416. In some embodiments, for each data object 402 of the positive risk-based cohort 416, the object impact measure 420 is generated based on the rules-based positive cohort impact measure 412, the negative risk-based cohort impact measure 419, and the risk score 414 associated with the data object 402. In some embodiments, the object impact measure 420 is generated using one or more impact measure algorithms or techniques, such as an algorithm or technique based on Equation 1. In some embodiments, in Equation 1, (i) $c_{3_a}$ denotes an object impact measure for a particular data object (e.g., object impact measure 420), (ii) w denotes a risk score for the particular data object (e.g., risk score 414), (iii) $c_2$ denotes a rules-based positive cohort impact measure (e.g., rules-based positive cohort impact measure 412), and (iv) $c_{3_b}$ denotes a negative risk-based cohort impact measure (e.g., negative risk-based cohort impact measure 419).

$$c_{3_a} = w * c_2 + (1 - w) * c_{3_b} \qquad \text{(Equation 1)}$$

In some examples, in a clinical prediction domain, an object impact measure may be generated for a member of a healthcare program who is not formally diagnosed with a health condition, does not meet clinical criteria for diagnosis of the health condition, and is not predicted to be positive for diagnosis of the health condition based on a risk score for the member. The object impact measure for the member may be generated using Equation 1 and based on (i) the risk score for the member, (ii) a rules-based positive cohort impact measure associated with members of the healthcare program who meet clinical criteria for diagnosis of the health condition (e.g., but do not have a documented formal diagnosis), and/or (iii) a negative risk-based cohort impact measure associated with members of the healthcare program who are not formally diagnosed with a health condition, do not meet clinical criteria for diagnosis of the health condition, and are not predicted to be positive for diagnosis of the health condition.

In some embodiments, each of the label-based impact measure 411, rules-based positive cohort impact measure 412, negative risk-based cohort impact measure 419, and one or more object impact measures 420 is a respective measure of causal effect for one or more causal variables on a predictive outcome. For example, each of the label-based impact measure 411, rules-based positive cohort impact measure 412, negative risk-based cohort impact measure 419, and one or more object impact measures 420 may indicate a predicted change to a predictive outcome for a corresponding cohort (e.g., label-based positive cohort 408, rules-based positive cohort 409, or negative risk-based cohort 415) or a data object 402 of a cohort (e.g., a data object 402 of a positive risk-based cohort 416). In some examples, each of the label-based impact measure 411, rules-based positive cohort impact measure 412, negative risk-based cohort impact measure 419, and one or more object impact measures 420 may be a predicted change to a level of resource utilization for a cohort of data objects 402 or particular data object 402. In a particular example, in a clinical prediction domain, each of the label-based impact measure 411, rules-based positive cohort impact measure 412, negative risk-based cohort impact measure 419, and one or more object impact measures 420 may be a predicted change to a number of hospital admissions of one or more members of a healthcare program.

In some embodiments, the predictive modeling techniques of the dataflow diagram 400 are repeated for a plurality of predictive labels. For example, in a clinical prediction domain, the predictive modeling techniques may be repeated for a plurality of health conditions. In some embodiments, impact measures for each data object 402 for each of a plurality of predictive labels are averaged to generate an average impact measure indicative of an average causal effect on a predictive outcome when a resource is distributed to the data object 402. In some embodiments, a plurality of data objects 402 may be ranked based on one or more predictive label-specific impact measures or an average impact measure. For example, as shown in Table 1, in a clinical prediction domain, an impact measure may be generated for each of a plurality of health conditions (e.g., represented as hierarchical condition codes (HHCs)) for a plurality of members of a healthcare program. As further shown in the proceeding table, the impact measures for each member may be averaged and a ranking of the members may be generated. In some embodiments, some of the predictive modeling techniques of the present disclosure overcome technical challenges of generating accurate causal effect predictions for data objects having inaccurate or incomplete documentation, which may improve accuracy of the causal effect predictions and provide efficiency and accuracy improvements to the distribution of resources to the data objects. In some embodiments, some of the predictive modeling techniques provide for improved accuracy in prioritizing distribution of a resource to data objects predicted to experience the greatest causal effect to a predictive outcome when provided the resource.

| Member | Impact Measures | | | | | |
| | HCC$_1$ | HCC$_2$ | ... HCC$_{83}$ | HCC$_{84}$ | Avg. | Rank |
|---|---|---|---|---|---|---|
| A | $c_1 = 0.35$ | $c_1 = 0.42$ | ... $c_1 = 0.25$ | $c_{3_b} = 0.07$ | 0.17 | 3 |
| B | $c_1 = 0.35$ | $c_{3_b} = 0.04$ | ... $c_1 = 0.25$ | $c_1 = 0.32$ | 0.24 | 1 |
| C | $c_2 = 0.42$ | $c_1 = 0.42$ | ... $c_1 = 0.25$ | $c_2 = 0.33$ | 0.19 | 2 |
| D | $c_{3_b} = 0.05$ | $c_2 = 0.25$ | ... $c_1 = 0.25$ | $c_1 = 0.32$ | 0.16 | 4 |

FIG. 5 provides an example architecture 500 of data object attributes in a clinical prediction domain in accordance with some embodiments discussed herein. In some embodiments, in a clinical prediction domain, a plurality of data objects may include a plurality of human subjects. In some embodiments, in a clinical prediction domain, the attributes 403 includes, for each human subject, medical claim data 501, medical lab data 503, medical chart data 505, and user data 507. In some embodiments, medical claim data 501 includes data constructs describing one or more medical conditions of the human subject, or a hereditary associate or partner thereof, and information related to the medical conditions. For example, the medical claim data 501 may include one or more of, but is not limited to, diagnoses (e.g., asthma, high blood pressure, diabetes, etc.), prognoses, treatment plans, procedures, and medication prescriptions.

In some embodiments, medical lab data 503 includes data constructs describing lab tests performed on a human subject and results thereof. For example, the medical lab data may include one or more of, but is not limited to, glucose test results, body-mass indexes, cholesterol levels, respiration rates, blood pressure measures, medical imaging data (e.g., data associated with X-ray, echocardiography, magnetic resonance imaging, radiation imaging, computed tomography, positive emission tomography, or other medical imaging techniques), electrocardiogram records, and electroencephalogram records.

In some embodiments, medical chart data 505 includes data constructs describing observations and conversations associated with the human subject, which may correspond to natural language data. For example, the medical chart data 505 may include one or more of, but is not limited, to subject responses to pain inquiries, observations of subject fatigue, observations of subject mental acuity or deficiency, and observations of subject speech or other physiological functions or behaviors (e.g., gait, memory, diet, mental state, etc.).

In some embodiments, user data 507 includes data constructs describing demographics and other non-medical information associated with a human subject. For example, the user data 507 may include one or more of, but is not limited to, age, gender, sex, ethnicity, smoker status, drinker status, other substance usage statuses, social and/or environmental determinants of health (e.g., income, social protection, education, employment history, working conditions, food security, housing security, amenity access, childhood development history, and medical care access).

FIG. 6 provides an example architecture 600 of knowledge graph data in a clinical prediction domain in accordance with some embodiments discussed herein. In some embodiments, the knowledge graph data 406 defines directed relationships between a plurality of nonlinear causal inferencing factors including confounders, causal variables, and predictive outcomes. In some embodiments, the confounders include data object attributes. In some examples, as shown in the example architecture 600, the knowledge graph data 406 may include one or more genetic confounders 601, one or more medical condition confounders 603, one or more behavioral confounders, such as a smoking confounder 605A and/or a lifestyle confounder 605B, and one or more health confounders 601E. Continuing the example, as shown in the example architecture 600, the knowledge graph data 406 may include causal variables 604, such as a number of clinical interactions. In the same example, as shown in the example architecture 600, the knowledge graph data 406 may include a predictive outcome 606, such as a change in a number of hospital admissions or a cost of providing a healthcare program. In some embodiments, the directed relationships between nonlinear causal inferencing factors are generated by a team of experts in the relevant domains, by one or more machine learning models, by one or more statistical analysis, or by one or more combinations thereof.

FIG. 7 provides an operational example of a directed acyclic graph 700 in a clinical prediction domain in accordance with some embodiments discussed herein. As described herein, in some embodiments, knowledge graph data includes one or more directed acyclic graphs.

In some embodiments, the directed acyclic graph 700 is a causal diagram that includes assumptions that are indicative of one or more interrelated and/or directed relationships between nonlinear causal inferencing factors. For example, the directed acyclic graph 700 may define interactions 715A, 715B, 717, 719A, 719B between directed relationships among confounders 701, 703, 705, 707, 709 (e.g., attributes), and a predictive outcome 713. In this example, the directed acyclic graph 700 may define prior assumptions around: (i) interactions 715A between clinical condition confounders 703 and the predictive outcome 713 (e.g., fall in number of admissions); (ii) interactions 715B between age and/or gender confounders 701 and the predictive outcome 713; (iii) interactions 717 between the age and/or gender confounders 701 and a prior admission rate confounder 705; (iv) interactions 719A between the age and/or gender confounder 701 and a home visit confounder 707 (e.g., number of at-home clinical interactions) or an office visit confounder 709 (e.g., number of in-office clinical interactions); (v) interactions 719B between the number of clinical condition confounders 703 and the predictive outcome 713; and (vi) interactions 721 between either, or both of, confounder 707 and confounder 709 and the predictive outcome 713.

Figure 8:
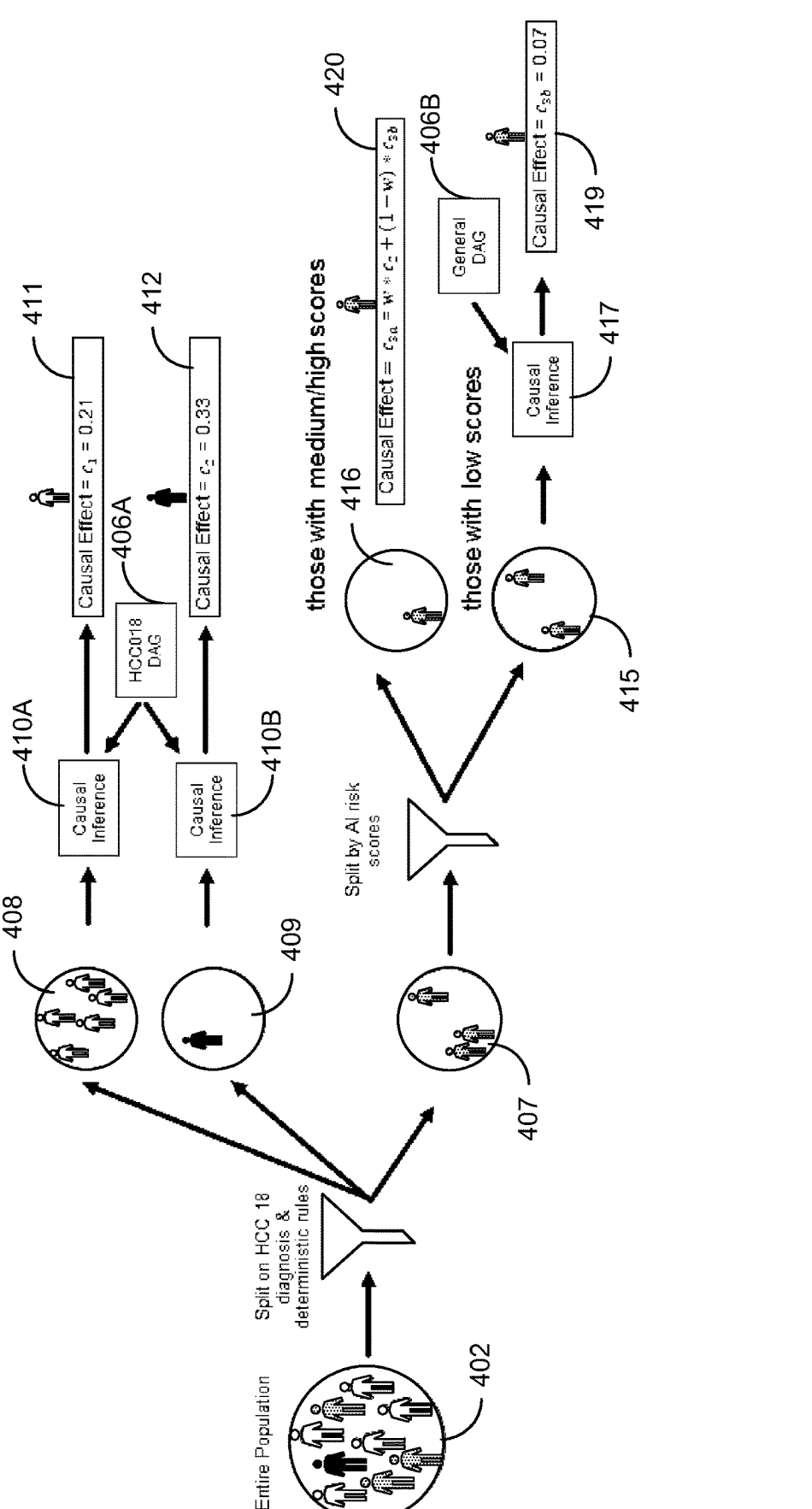
FIG. 8 provides a diagram of an example workflow for generating impact measures for data objects and cohorts of data objects in a clinical prediction domain in accordance with some embodiments discussed herein.

FIG. 8 provides a diagram of an example workflow 800 for generating impact measures for data objects and cohorts of data objects in a clinical prediction domain in accordance with some embodiments discussed herein.

In some embodiments, the workflow 800 includes generating a label-based positive cohort 408, a rules-based positive cohort 409, and a negative cohort 407 from a dataset of data objects 402. For example, the cohorts may be based on a predictive label. In some examples, for a clinical prediction domain, the predictive label may include a medical classification, such as a hierarchical condition code (HCC). By way of example, the predictive label may include HCC 18 for a diabetes use case. In some examples, the attributes of a data object 402 may be queried to determine whether the attributes include a formal diagnosis for HCC 18. In the event of a formal diagnosis the data object may be assigned to a respective cohort to generate the label-based positive cohort 408.

In some embodiments, the workflow 800 includes comparing attributes of data objects 402 that lack a formal diagnosis for HCC 18 to one or more deterministic rules associated with diagnosing HCC 18. For example, for each member whose attributes do not indicate a formal diagnosis for HCC 18, the member's attributes may be compared to clinical criteria for diagnosing HCC 18. In some example, the rules-based positive cohort 409 may be generated based on a comparison between the attributes to the one or more deterministic rules. For example, the rules-based positive cohort 409 may include one or more members of the population, where attributes of the member do not indicate a formal diagnosis for HCC 18 but satisfy clinical criteria for diagnosing HCC 18. In some examples, the negative cohort

407 includes data objects 402 with attributes that do not indicate a formal diagnosis for HCC 18 and do not meet the one or more deterministic rules for diagnosing HCC 18.

In some embodiments, the workflow 800 includes using a positive causal inference model to generate a label-based positive cohort impact measure 411 and/or a rules-based positive cohort impact measure 412 based on attributes of the data objects 402 of the label-based positive cohort 408 and/or rules-based positive cohort 409. For example, the label-based positive cohort impact measure 411 may be generated using a first positive causal inference model 410A and knowledge graph data 406A corresponding to the predictive label (e.g., HCC 18). In addition, or alternatively, the rules-based positive cohort impact measure 412 may be generated using a second positive causal inference model 410B and the knowledge graph data 406A.

In some embodiments, the knowledge graph data 406A includes a directed acyclic graph (DAG) that includes causal relationships and/or assumptions associated with predicting hospital admissions (e.g., or other predictive health outcomes, such as mortality rates, results of a particular test, cost of care, etc.,) for healthcare program members that have a formal diagnosis or meet diagnostic criteria for HCC 18. The label-based positive cohort impact measure 411 may indicate a predicted reduction in average hospital admissions for members of the label-based positive cohort 408 when an additional clinical interaction is distributed to the members. The rules-based positive cohort impact measure 412 may indicate a predicted reduction in average hospital admissions for members of the rules-based positive cohort 409 when an additional clinical interaction is distributed to the members.

In some embodiments, the workflow 800 includes generating a risk score for each data object 402 of the negative cohort 407 using a machine learning prediction model and based on respective attributes of each data object 402. The risk score may be indicative of a likelihood that a member will be diagnosed with HCC 18. In some embodiments, the workflow 800 includes generating a positive risk-based cohort 416 and a negative risk-based cohort 415 based on the risk scores. For example, the positive risk-based cohort 416 may include members determined to have a medium or high likelihood of being diagnosed with HCC 18 based on the member's corresponding risk score, and the negative risk-based cohort 415 may include members determined to have a low likelihood of being diagnosed with HCC 18 based on the member's corresponding risk score. In some embodiments, the workflow 800 includes comparing each risk score to one or more risk thresholds to determine if the corresponding data object 402 is associated with a medium-to-high likelihood of being associated with HCC 18 or a low likelihood of being associated with HCC 18. By way of example, the risk score may include a probability between 0 and 1. In some examples, the risk thresholds may include a 0.5 threshold, such that data objects associated with a risk score equal to or above 0.5 may be assigned to a positive risk-based cohort 416 and data object associated with a risk score below 0.5 may be assigned to a negative risk-based cohort 415.

In some embodiments, the workflow 800 includes using a negative causal inference model 417 to generate a negative risk-based cohort impact measure 419 based on attributes of the data objects 402 of the negative risk-based cohort 415 and knowledge graph data 406B. In some embodiments, the knowledge graph data 406B includes a directed acyclic graph (DAG) that includes causal relationships and/or assumptions associated with predicting changes in hospital admissions (e.g., or other predictive health outcomes, such as mortality rates, results of a particular test, cost of care, etc.,) for healthcare program members that do not have a formal diagnosis or meet diagnostic criteria for HCC 18 and have a low likelihood (e.g., a risk score below 0.5, etc.) of being diagnosed with HCC 18. The negative risk-based cohort impact measure 419 may indicate a predicted reduction in average hospital admissions for members of the negative risk-based cohort 415 when an additional clinical interaction is distributed to the members.

In some embodiments, the workflow 800 includes generating an object impact measure 420 for each data object 402 of the positive risk-based cohort 416 based on the corresponding risk score, the rules-based positive cohort impact measure 412, and the negative risk-based cohort impact measure 419. The object impact measure 420 for each member of the positive risk-based cohort 416 may indicate a predicted reduction in hospital admissions for the member when an additional clinical interaction is distributed to the member.

In this manner, the impact measures may be tailored to data objects (e.g., members of a population) based on an object cohort representative of an object's association with a predictive label. This enables some of the predictive modeling techniques of the present disclosure to improve accuracy of nonlinear causal effect predictions for a predictive outcome by identifying and accounting for data objects in a population that have incomplete or inaccurate attributes with respect to a predictive label.

Figure 9:
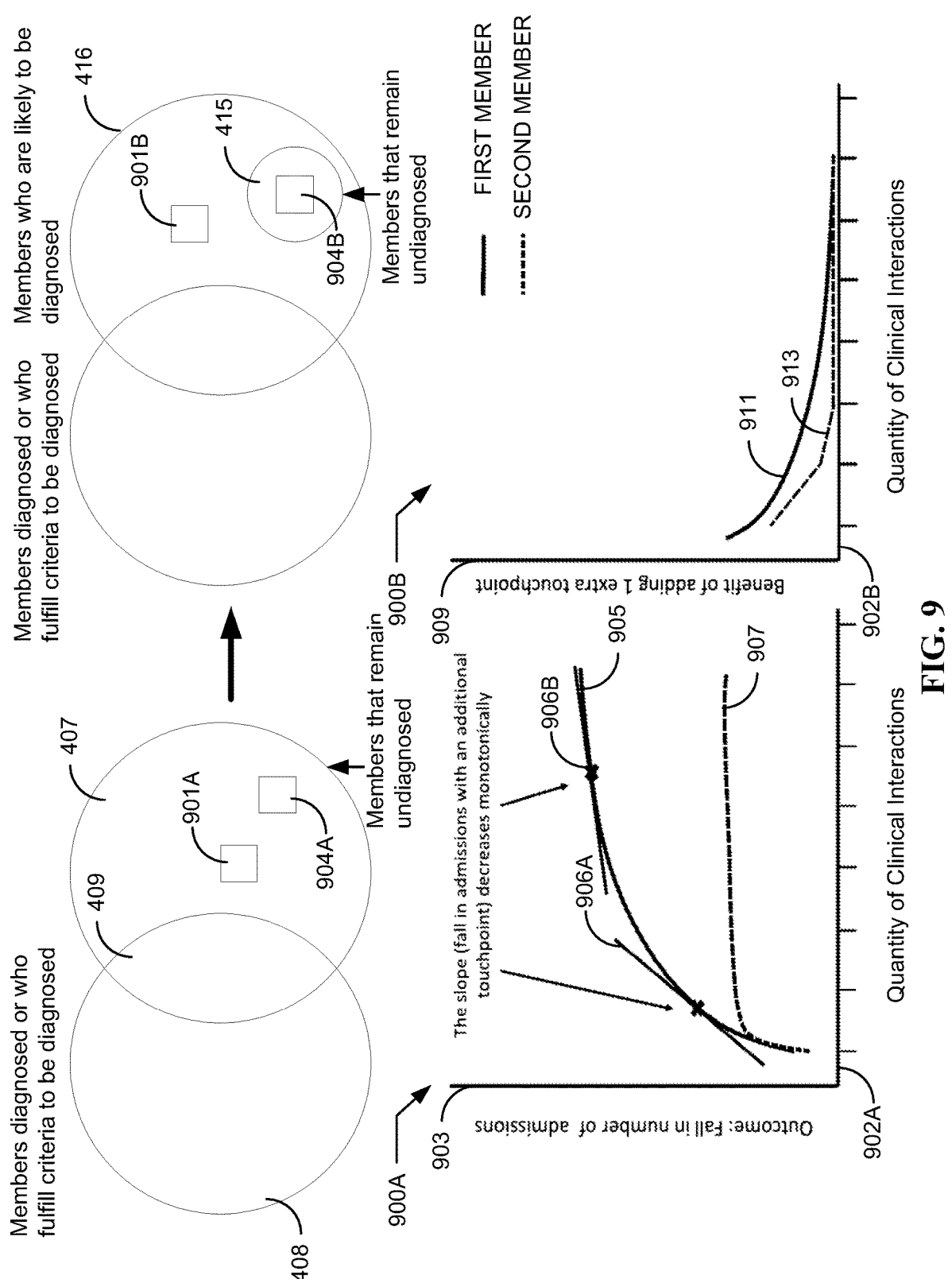
FIG. 9 provides operational examples of causal relationships generated by a causal inference model in a clinical prediction domain in accordance with some embodiments discussed herein.

FIG. 9 provides operational examples of causal relationships 900A, 900B generated by a causal inference model in a clinical prediction domain in accordance with some embodiments discussed herein. In some embodiments, the causal relationships 900A, 900B are generated using a machine learning model, such as a non-parametric double/debiased machine learning model leveraging supervised machine learning regression techniques. In some embodiments, some of the predictive modeling techniques of the present disclosure utilize one or more causal inference models to predict an impact measure (e.g., causal effect) on a predictive outcome for a cohort of data objects, or a particular data object, when a resource is distributed to corresponding data objects of the cohort, or to the particular data object. As described herein, the causal inference model may generate an impact measure based on attributes of one or more data objects and knowledge data, such as a directed acyclic graph (DAG). In some embodiments, some of the predictive modeling techniques of the present disclosure use the impact measures generated by causal inference models to generate object impact measures, such as for data objects of a risk-based negative cohort.

In some embodiments, in a clinical prediction domain, some of the predictive modeling techniques of the present disclosure generate, based on a dataset of healthcare program members, a label-based positive cohort 408, a rules-based positive cohort 409, and a negative cohort 407. In some examples, the negative cohort 407 may include a first member 901A, B and a second member 904A, 904B. In some embodiments, based on a risk score for each member, some of the predictive modeling techniques of the present disclosure generate a positive risk-based cohort 416 and a negative risk-based cohort 415. In some examples, the positive risk-based cohort 416 may include the first member 901A, B and the negative risk-based cohort 415 may include the second member 904A, B. Thus, various embodiments of the predictive modeling techniques of the present disclosure may determine that the second member 904A, B lacks a formal diagnosis for a health condition, fails to meet clinical criteria for diagnosis of the health condition (e.g., based on documented health records), and/or has a low likelihood of being diagnosed with the health condition. In addition, or alternatively, the first member 901A, B, while lacking a formal diagnosis and failing to meet the clinical criteria for the health condition, may be likely to be diagnosed with the health condition. In some embodiments, some of the predictive modeling techniques of the present disclosure utilize causal inference models to generate the causal relationships 900A. 900B to predict causal effects (e.g., impact measures) for members of the label-based positive cohort 408, members of the rules-based positive cohort 409, and the second member 904A, B associated with the negative risk-based cohort 415.

In some embodiments, some of the predictive modeling techniques of the present disclosure use the predicted causal effects for the rules-based positive cohort 409 and the negative risk-based cohort 415 and a risk score of the first member 901A, B to generate a predicted causal effect (e.g., impact measure) for the first member 901A, B. In various embodiments, the causal relationship 900A indicates relationships between various values of a causal variable for the first member 901A, B and the second member 904A, B and a predictive outcome, which may be determined using some of the predictive modeling techniques presented herein. In some embodiments, the causal relationship 900B indicates relationships between the various values of the causal variable for the first member 901A, B and the second member 904A, B and a change to the predictive outcome (e.g., causal effect), which may be determined using some of the predictive modeling techniques described herein.

In some embodiments, the causal relationship 900A includes a nonlinear causal inference curve 905 that indicates a relationship between a quantity of clinical interactions 902A distributed to the first member 901A, B and a predictive quantity of hospital admissions 903 for the first member 901A, B based on the quantity of clinical interactions 902A. In some embodiments, a slope 906A, 906B of the nonlinear causal inference curve 905 may indicate a predictive outcome respective to the quantity of hospital admissions 903 for the first member 901A, B, such as a predicted reduction in hospital admissions of the first member 901A, B.

In some embodiments, the causal relationship 900A includes a nonlinear causal inference curve 907 that indicates a relationship between the quantity of clinical interactions 902A distributed to the second member 904A, B and a predictive quantity of hospital admissions 903 for the second member 904A, B based on the quantity of clinical interactions 902A. In some embodiments, a slope of the nonlinear causal inference curve 907 may indicate a predictive outcome respective to the quantity of hospital admissions 903 for the second member 904A, B, such as a predicted reduction in hospital admissions of the second member 904A, B.

In some embodiments, the causal relationship 900B indicates a causal effect 909 of the quantity of clinical interactions 902B distributed to the first member 901A, B and the second member 904A, B. In some embodiments, the causal effect 909 corresponds to an impact measure. The causal effect 909 may indicate a predicted reduction in quantity of hospital admissions (e.g., based on quantity of clinical interactions 902B distributed to a member). In some embodiments, the causal relationship 900B includes a nonlinear causal inference curve 911 that indicates a relationship between quantity of clinical interactions 902A distributed to the first member 901A, B and the causal effect 909 on quantity of hospital admissions 903 for the first member 901A, B based on slopes of the nonlinear causal inference curve 905. In some embodiments, the causal relationship 900B includes a nonlinear causal inference curve 913 that indicates a relationship between quantity of clinical interactions 902B distributed to the second member 904A, B and the causal effect 909 on the quantity of hospital admissions 903 for the first member 901A, B based on slopes of the nonlinear causal inference curve 907.

In some embodiments, the causal relationships 900A, 900B demonstrate the improved accuracy of impact measure generation provided by various embodiments of the predictive modeling techniques. For example, previous approaches may fail to determine the first member 901A, 901B is likely to be diagnosed with the health condition and, thus, distribute a lower quantity of clinical interactions to the first member 901A, 901B under false assumption the first member 901A, 901B is unassociated with the health condition, which may result in adverse health outcomes and increase hospitalization of the first member 901A, 901B. Various embodiments of the predictive modeling techniques of the present disclosure may overcome such deficiencies of previous approaches by generating more accurate determinations of association between a member and a health condition (e.g., or other data objects and predictive labels), which may improve the accuracy and efficiency of resource distribution to all members of a healthcare program. For example, some predictive techniques of the present disclosure may determine that the first member 901A, B is likely to be diagnosed with the health condition despite lacking a formal diagnosis or criteria-compliant documentation and determine that the first member 901A, B may experience a greater reduction in hospitalizations when provided an additional clinical interaction as compared to the second member 904A, 904B.

FIG. 10 is a flowchart diagram of an example process 1000 for generating impact measures for data objects and cohorts of data objects in accordance with some embodiments described herein. The flowchart depicts nonlinear causal inference techniques for generating cohorts of data objects associated with or unassociated with a predictive label to overcome various limitations of traditional predictive techniques. The nonlinear causal inference techniques may be implemented by one or more computing devices, entities, and/or systems described herein. For example, via the various steps/operations of the process 1000, the predictive data analysis system 101 may leverage the nonlinear causal inference techniques to overcome the various limitations with traditional techniques by using nonlinear causal inference models, deterministic rules, and machine learning prediction models to generate predict causal effects of distributing a resource to each of a plurality of cohorts, or data objects thereof, on a predictive outcome.

FIG. 10 illustrates an example process 1000 for explanatory purposes. Although the example process 1000 depicts a particular sequence of steps/operations, the sequence may be altered without departing from the scope of the present disclosure. For example, some of the steps/operations depicted may be performed in parallel or in a different sequence that does not materially impact the function of the process 1000. In other examples, some of the steps/operations depicted may be omitted or combined in a manner that does not materially impact the function of the process 1000. In other examples, different components of an example device or system that implements the process 1000 may perform functions at substantially the same time or in a specific sequence.

In some embodiments, the process 1000 includes, at step/operation 1003, obtaining one or more datasets. For example, the predictive data analysis system 101 may obtain the one or more datasets. In some embodiments, the datasets are received from one or more client computing entities. For example, the predictive data analysis system 101 may receive the datasets from one or more client computing entities, such as a client computing entity 102. In some embodiments, the dataset includes one or more data objects. In some embodiments, the dataset includes attributes for the one or more data objects. In some embodiments, the dataset includes knowledge graph data associated with the attributes. In some embodiments, the dataset includes a historical predictive outcome and/or a historical predictive cost thereof. In some embodiments, attributes and/or knowledge graph data are obtained from a data store or other memory. For example, the predictive data analysis system 101 may obtain attributes and/or knowledge graph data a data store or other memory. In some examples, in a clinical prediction domain, the predictive data analysis system 101 may receive healthcare records (e.g., historical data) for a plurality of members of a healthcare program and extracts, from the healthcare records, international classification of diseases (ICD) codes, current procedural terminology (CPT) codes, prescription (Rx) codes, and/or logical observation identifiers, names, and codes (LOINC) data (e.g., attributes) for each of the plurality of members.

In some embodiments, the process 1000 includes, at step/operation 1006, generating one or more positive cohorts and a negative cohort. For example, the predictive data analysis system 101 may generate the positive cohort and the negative cohort. In some embodiments, the positive cohort includes one or more data objects of the dataset that are associated with a predictive label and the negative cohort includes one or more data objects of the dataset that are unassociated with the predictive label. In some embodiments, the positive cohort includes a label-based positive data object cohort and a rules-based positive data object cohort. In some embodiments, the negative data object cohort includes a rules-based negative cohort, which may be utilized at steps/operations 1018 and/or 1021 to generate a positive risk-based cohort and a negative risk-based cohort.

In some embodiments, the step/operation 1006 includes generating a label-based positive cohort by identifying, based on attributes, one or more data objects that are assigned to a predictive label. In some examples, in a clinical prediction domain, the predictive data analysis system 101 may, for each of a plurality of healthcare program member, determine whether healthcare records for the member includes a formal diagnosis for a particular health care condition. In some embodiments, the step/operation 1006 includes generating a rules-based positive cohort by identifying one or more data objects associated with a predictive label based on a comparison of one or more deterministic rules to attributes of the data object. In some embodiments, the data objects assessed for generating the rules-based positive cohort include data objects that were not included in the label-based positive cohort. For example, the label-based positive cohort and the rules-based positive cohort may be mutually exclusive. In some examples, in a clinical prediction domain, the predictive data analysis system 101 may compare, for each member of a healthcare program, diagnostic criteria for a health condition (e.g., deterministic rules) to health records associated with the member (e.g., attributes). Based on the comparison, the predictive data analysis system 101 may determine that the diagnostic criteria for the health condition are met and, in response, include the member in the rules-based positive cohort. In some embodiments, by generating both label-based cohorts and rules-based positive cohorts, some of the predictive modeling techniques of the present disclosure improve accuracy of impact measure predictions by more accurately segmenting data objects into cohorts that are associated or unassociated with a predictive label. Such techniques may overcome technical challenges associated with instances of incomplete or inaccurate documentation for whether a data object is formally assigned to a predictive label. For example, previous approaches may include a data object lacking assignment to a predictive label in a negative cohort, thereby reducing accuracy of impact measure predictions where, despite lacking the formal assignment, the data object meets criteria for being associated with the predictive label.

In some embodiments, the step/operation 1006 includes determining one or more attributes of a data object that contribute to, or temporally correspond to, association of a data object with a predictive label. For example, in response to determining a data object is associated with a predictive label based on a comparison between one or more deterministic rules and attributes of the data object, the predictive data analysis system 101 may determine a subset of the attributes of the data object including (i) one or more attributes that met the one or more deterministic rules (e.g., attributes that contributed to the association with the predictive label), and (ii) one or more attributes that temporally correspond to a point in time at which the data object may be positively associated with the predictive label. In some examples, in a clinical prediction domain, the predictive data analysis system 101 compares historical health records of a healthcare program member to diagnostic criteria for diagnosis of a health care condition. In response to determining that medical chart data associated with a particular date meets the diagnostic criteria for diagnosis of the health condition, the predictive data analysis system 101 may determine a subset of the health records that correspond to a period extending from the particular date.

In some embodiments, the process 1000 includes, at step/operation 1009, obtaining a positive causal inference model. For example, the predictive data analysis system 101 may obtain the positive causal inference model. In some embodiments, obtaining the positive causal inference model includes generating the positive causal inference model. For example, the predictive data analysis system 101 may generate the positive causal inference model based on model data that defines the positive causal inference model. In some embodiments, obtaining the positive causal inference model includes receiving the positive causal inference model or data that defines the positive causal inference model. For example, the predictive data analysis system 101 receive the positive causal inference model, or model data, from one or more client computing entities. In some examples, the predictive data analysis system 101 may retrieve the positive causal inference model, or model data, from storage, such as memory or one or more data stores. In some embodiments, the positive causal inference model is a non-parametric machine learning model. For example, the predictive data analysis system 101 may obtain a non-parametric machine learning model. In some embodiments, the non-parametric machine learning model may be a double machine learning model or a double/debiased machine learning model.

In some embodiments, the positive causal inference model is indicative of a causal relationship between a causal variable and a predictive outcome of a positive cohort, such as a label-based positive cohort or a rules-based positive cohort. For example, the positive causal inference model may indicate a causal relationship between a predictive outcome and various values of a causal variable (e.g., when other causal variables, such as attributes of data objects, are present). The positive causal inference model may be configured to generate, based on attributes and knowledge graph data, one or more impact measures (e.g., nonlinear causal effect predictions) indicative of a causal effect of one or more causal variables on a predictive outcome. The knowledge graph data for the positive causal inference model may include causal relationships and/or corresponding assumptions that are associated with data objects positively associated with the predictive label. For example, in a clinical prediction domain, the knowledge graph data may include a directed acyclic graph (DAG) that includes causal relationships and/or assumptions associated with predicting hospital admissions for healthcare program members that have a formal diagnosis for a particular health condition or meet diagnostic criteria for the particular health condition. In some embodiments, the positive causal inference model is generated based on the predictive label. For example, the predictive data analysis system 101 may generate the positive causal inference model based on the predictive label. In some examples, to generate positive causal inference model, the predictive data analysis system 101 may obtain knowledge graph data associated with predicting causal effects on a predictive outcome for data objects positively associated with the predictive label.

In some embodiments, the process 1000 includes, at step/operation 1012, generating a label-based positive cohort impact measure. For example, the predictive data analysis system 101 may generate the label-based positive cohort impact measure. In some embodiments, the label-based positive cohort impact measure is generated using the positive causal inference model. For example, the predictive data analysis system 101 may use the positive causal inference model to generate a label-based positive cohort impact measure for the label-based positive cohort, where the label-based positive cohort impact measure indicates a predicted causal effect on a predictive outcome when one or more resources are distributed to data objects of the label-based positive cohort. In some embodiments, the predictive causal inference model takes, as input, attributes of the data objects of the label-based positive cohort. In some examples, in a clinical domain context, for a cohort of healthcare program members who have a formal diagnosed for a health condition, the predictive data analysis system 101 utilizes the positive causal inference model and, as an input to the model, health records of cohort members. The predictive data analysis system may generate, using the positive causal inference model and health records, a label-based positive cohort impact measure indicative of a predicted reduction in hospital admissions of the cohort members when an additional clinical interaction is distributed to each cohort member.

In some embodiments, the process 1000 includes, at step/operation 1015, generating a rules-based positive cohort impact measure. For example, the predictive data analysis system 101 may generate a rules-based positive cohort impact measure. In some embodiments, the rules-based positive cohort impact measure is generated using the positive causal inference model. For example, the predictive data analysis system 101 may use the positive causal inference model to generate a rules-based positive cohort impact measure for the rules-based positive cohort. The rules-based positive cohort impact measure may indicate a predicted causal effect on a predictive outcome when one or more resources are distributed to data objects of the rules-based positive cohort. In some embodiments, the predictive causal inference model takes, as input, attributes of the data objects of the rules-based positive cohort.

In some examples, in a clinical domain context, for a cohort of healthcare program members who do not have a formal diagnosed for a health condition but whose health records meet clinical criteria for diagnosis of the health condition, the predictive data analysis system 101 utilizes the positive causal inference model and, as an input to the model, health records of the cohort members. The predictive data analysis system 101 may generate, using the positive causal inference model and the health records, a rules-based positive cohort impact measure indicative of a predicted reduction in hospital admissions of the cohort members when an additional clinical interaction is distributed to each cohort member.

In some embodiments, the rules-based positive cohort impact measure is generated using a subset of attributes of the data objects associated with the rules-based positive cohort. In some embodiments, the rules-based positive cohort impact measure is generated using a subset of the attributes that (i) contributed to determination of each data object being associated with the predictive label, and/or (ii) correspond temporally to a date or other time interval at which the data object is determined to be associated with the predictive label based on one or more deterministic rules. For example, in a clinical prediction domain, the predictive data analysis system 101 may generate a rules-based positive cohort including a plurality of healthcare program members whose health records (e.g., attributes) meet clinical diagnosis criteria (e.g., deterministic rules) for a health condition (e.g., a predictive label). For each member of the rules-based positive cohort, the predictive data analysis system 101 may determine a date for a subset of the member's health records that meet the clinical diagnosis criteria for the health condition. The determined date may indicate a point in time after which the member may be considered positive for diagnosis of the health care condition. The predictive data analysis system 101 may generate, using a positive causal inference model, a rules-based positive cohort impact measure for the rules-based positive cohort based on the determined subset of each member's health records that are associated with the determined date and additional health records that post-date the determined date. In other words, in some embodiments, when generating the rules-based positive cohort impact measure, some of the predictive modeling techniques of the present disclosure exclude, from input of the positive causal inference model, attributes, or other historical data, that predates a time period before which a data object is not associated with a predictive label based on one or more deterministic rules for that label.

In some embodiments, the process 1000 includes, at step/operation 1018, generating risk scores. For example, the predictive data analysis system 101 may generate the risk scores. In some embodiments, a risk score is generated for each data object of the negative cohort. In some embodiments, the negative cohort includes one or more data objects determined to be unassociated with the predictive label based on a comparison between attributes of the data object and one or more deterministic rules for the predictive label. In other words, the negative cohort may be a rules-based negative cohort. In some embodiments, a risk score is generated for each data object of the negative cohort using a machine learning prediction model. For example, to generate a risk score for each data object, the predictive data analysis system 101 may use a machine learning prediction model configured to process, as input, attributes of the data object and generate, as output, a risk score indicative of a likelihood of the data object being associated with the predictive label. In some examples, in a clinical prediction domain, for each member of a healthcare program determined to be unassociated with a health condition, the predictive data analysis system 101 may utilize a machine learning prediction model and attributes of the member generate a risk score indicative of a likelihood of the member having the health condition. In some embodiments, the machine learning prediction model is a neural network. For example, the predictive data analysis system 101 may generate the risk scores using a neural network previously trained to generate a probabilistic metric for indicating likelihood of a data object being associated with a predictive label. In some embodiments, the risk score is a scaling value within a predetermined range. For example, the risk score may a scaling value in a range between 0.0 and 1.0, where 0.0 indicates a lowest probability that a data object is associated with the predictive label and 1.0 indicates a highest probability that the data object is associated with the predictive label.

In some embodiments, the process 1000 includes, at step/operation 1021, generating a positive risk-based cohort and a negative risk-based cohort. For example, the predictive data analysis system 101 may generate the positive risk-based cohort and a negative risk-based cohort. In some embodiments, generating the positive risk-based cohort and the negative risk-based cohort includes comparing the risk score of each data object of the negative cohort to a predetermined risk threshold. In some embodiments, generating the positive risk-based cohort includes determining a subset of data objects of the negative cohort for which the corresponding risk score for the data object meets or exceeds a risk threshold. In some embodiments, generating the negative risk-based cohort includes determining a subset of data objects of the negative cohort for which the corresponding risk score for the data object fails to meet the risk threshold. For example, for each data object of the negative cohort, the predictive data analysis system 101 may compare the corresponding risk score to a risk threshold. In some embodiments, the risk threshold is a particular scaling value within a scaling range, where a risk score that meets or exceeds the particular scaling value indicates a corresponding data object is positively associated with a predictive label. For example, in a scaling range between 0.0 and 1.0, a risk threshold may be 0.2 such that the predictive data analysis system 101 determines a data object having a risk score equal to or greater than 0.2 to be associated with the predictive label (e.g., a data object having a risk score less than 0.2 being determined to be unassociated with the predictive label). In some examples, in a clinical prediction domain, the predictive data analysis system 101 compares a risk score to a predetermined risk threshold, where the risk score indicates a likelihood of a member of a healthcare program having a positive diagnosis for a health condition. In response to determining the risk score meets the risk threshold, the predictive data analysis system 101 may (i) determine the member is likely to have a positive diagnosis for the health condition, and (ii) in response to the determination, include the member in a positive risk-based cohort. In response to determining the risk score fails to meet the risk threshold, the predictive data analysis system 101 may (i) determine the member is unlikely to have a positive diagnosis for the health condition, and (ii) in response to the determination, include the member in a negative risk-based cohort.

In some embodiments, the process 1000 includes, at step/operation 1024, obtaining a negative causal inference model. For example, the predictive data analysis system 101 may obtain the negative causal inference model. In some embodiments, obtaining the negative causal inference model includes generating the negative causal inference model. For example, the predictive data analysis system 101 may generate the negative causal inference model based on model data that defines the negative causal inference model. In some embodiments, obtaining the negative causal inference model includes receiving the negative causal inference model or data that defines the negative causal inference model. For example, the predictive data analysis system 101 receive the negative causal inference model, or model data, from one or more client computing entities. In some examples, the predictive data analysis system 101 may retrieve the negative causal inference model, or model data, from storage, such as memory or one or more data stores. In some embodiments, the negative causal inference model is a non-parametric machine learning model. For example, the predictive data analysis system 101 may obtain a non-parametric machine learning model. In some embodiments, the non-parametric machine learning model may be a double machine learning model or a double/debiased machine learning model.

In some embodiments, the negative causal inference model is indicative of a causal relationship between a causal variable and a predictive outcome of a negative cohort, such as a risk-based negative cohort. For example, the negative causal inference model may indicate a causal relationship between a predictive outcome and various values of a causal variable (e.g., when other causal variables, such as attributes of data objects, are present). The negative causal inference model may be configured to generate, based on attributes and knowledge graph data, one or more impact measures indicative of a causal effect of one or more causal variables on a predictive outcome. The knowledge graph data for the negative causal inference model may include causal relationships and/or corresponding assumptions that are associated with data objects negatively associated with the predictive label. For example, in a clinical prediction domain, the knowledge graph data may include a directed acyclic graph (DAG) that includes causal relationships and/or assumptions associated with predicting hospital admissions for healthcare program members that do not have a formal diagnosis for a particular health condition and/or fail to meet diagnostic criteria for the particular health condition. In some examples, the knowledge graph data may include a DAG that includes causal relationships and/or assumptions associated with predicting hospital admissions in individuals or populations associated with an average level of health and wellness.

In some embodiments, the negative causal inference model is generated based on the predictive label. For example, the predictive data analysis system 101 may generate the negative causal inference model based on the predictive label. In some examples, to generate negative causal inference model, the predictive data analysis system 101 may obtain knowledge graph data associated with predicting causal effects on a predictive outcome for data objects negatively associated with the predictive label.

In some embodiments, the process 1000 includes, at step/operation 1027, generating a negative risk-based cohort impact measure. For example, the predictive data analysis system 101 may generate the negative risk-based cohort impact measure. In some embodiments, the negative risk-based cohort impact measure is generated using the negative causal inference model. For example, the predictive data analysis system 101 may use the negative causal inference model to generate a rules-based positive cohort impact measure for the negative risk-based cohort. The negative risk-based cohort impact measure may indicate a predicted causal effect on a predictive outcome when one or more resources are distributed to data objects of the negative risk-based cohort. In some embodiments, the predictive causal inference model takes, as input, attributes of the data objects of the negative risk-based cohort.

In some examples, in a clinical domain context, for a cohort of healthcare program members who do not have a formal diagnosed for a health condition, whose health records do not meet clinical criteria for diagnosis of the health condition, and for whom the corresponding risk scores fail to meet a risk threshold, the predictive data analysis system 101 utilizes the negative causal inference model and, as an input to the model, health records of the cohort members. The predictive data analysis system 101 may generate, using the negative causal inference model and the health records, a negative risk-based cohort impact measure indicative of a predicted reduction in hospital admissions of the cohort members when an additional clinical interaction is distributed to each cohort member.

In some embodiments, the negative risk-based impact measure is generated using a subset of attributes of the data objects associated with the negative risk-based cohort. In some embodiments, the negative risk-based cohort impact measure is generated using a subset of the attributes that (i) contributed to determination of each data object being unassociated with the predictive label, and/or (ii) correspond temporally to a date or other time interval at which the data object is determined to be unassociated with the predictive label based on one or more deterministic rules and/or a risk score. For example, in a clinical prediction domain, the predictive data analysis system 101 may generate a negative risk-based cohort including a plurality of healthcare program members whose health records (e.g., attributes) fail to meet clinical diagnosis criteria (e.g., deterministic rules) for a health condition (e.g., a predictive label) and for which a corresponding risk score fails to meet a risk threshold for being likely to have the health condition. For each member of the negative risk-based cohort, the predictive data analysis system 101 may determine a date on or after which a subset of the member's health records fail to meet the clinical diagnosis criteria for the health condition and for which a corresponding risk score fails to meet a risk threshold for the health condition. The determined date may indicate a point in time after which the member may be considered negative for diagnosis of the health care condition. The predictive data analysis system 101 may generate, using a negative causal inference model, a negative risk-based cohort impact measure for the negative risk-based cohort based on the determined subset of each member's health records that are associated with the determined date and/or additional health records that post-date the determined date. In other words, in some embodiments, when generating the negative risk-based cohort impact measure, some of the predictive modeling techniques of the present disclosure exclude, from input of the positive causal inference model, attributes, or other historical data, that predates a time period before which a data object is associated with a predictive label based on one or more deterministic rules for that label.

As one example, in a clinical prediction domain, the health condition includes diagnosis for asthma. When generating a negative risk-based cohort impact measure for a negative risk-based cohort of healthcare program members that do not have a diagnosis for asthma and do not demonstrate a threshold-satisfying level of risk for having asthma, the predictive data analysis system 101 may exclude health records that are associated with a date before which a corresponding member previously had a formal diagnosis for asthma, met clinical criteria for diagnosis of asthma, or met a risk threshold for being likely to have asthma.

In some embodiments, the process 1000 includes, at step/operation 1030, generating one or more object impact measures. For example, the predictive data analysis system 101 may generate the one or more object impact measures. In some embodiments, an object impact measure is generated for at least one data object of the positive risk-based cohort. For example, the predictive data analysis system 101 may generate an object impact measure for a particular data object of the positive risk-based cohort. In some embodiments, an object impact measure is generated for each data object of the positive risk-based cohort. In some embodiments, an object impact measure for a data object of the positive risk-based cohort is generated based on a corresponding risk score for the data object, a positive cohort impact measure, such as a rules-based positive cohort impact measure, and a negative cohort impact measure, such as a negative risk-based cohort impact measure. For example, the predictive data analysis system 101 may generate an object impact measure for a particular data object of the positive risk-based cohort based on a risk score indicative of a likelihood of the data object being associated with the predictive label (e.g., generated at step/operation 1018), the rules-based positive cohort impact measure of step/operation 1015, and the negative risk-based cohort impact measure of step/operation 1027. In some embodiments, the object impact measure is generated using an impact measure algorithm or techniques. For example, the predictive data analysis system 101 may generate an object impact measure using Equation 1. In some embodiments, an object impact measure is generated for each data object of the positive risk-based cohort based on the rules-based positive cohort impact measure, the negative risk-based cohort impact measure, and the corresponding risk score for the data object.

In some examples, in a clinical prediction domain, the predictive data analysis system 101 may generate a rules-based positive cohort impact measure associated with members of a healthcare program that meet clinical criteria for diagnosis of a health condition and a negative risk-based cohort impact measure associated with members of the healthcare program determined to be at low or no risk for having the health condition based on corresponding risk scores. The predictive data analysis system 101 may generate an object impact measure for each member of a positive risk-based cohort (e.g., each of whom are determined to be at risk of having the health condition based on a respective risk score) based on the risk score for the member, the positive rules-based cohort impact measure, and the negative risk-based cohort impact measure. The positive rules-based cohort impact measure, the negative risk-based cohort impact measure, and each of the object impact measures may indicate a predicted causal effect on a reduction in hospital admissions (e.g., or other predictive outcome) when an additional clinical interaction is distributed to the corresponding members. Other non-limiting examples of the predictive outcome in the clinical prediction domain may include mortality rate, cost of providing a healthcare program, or results of a particular lab test, such as body-mass index, cholesterol, or one or more biomarker indicators of biological age.

In some embodiments, the process 1000 includes, at step/operation 1033, providing the impact measures of steps/operations 1012, 1015, 1027, and 1030 to one or more client computing entities. For example, the predictive data analysis system 101 may provide the impact measures of steps/operations 1012, 1015, 1027, and 1030 to one or more client computing entities 102. In some embodiments, the generated data object cohorts and corresponding impact measures are provided to one or more client computing entities. For example, the predictive data analysis system 101 may provide, to one or more client computing entities 102, (i) the one or more positive cohorts of step/operation 1003 (e.g., a label-based positive cohort and/or a rules-based positive cohort) and the corresponding label-based positive cohort impact measure of step/operation 1012 and/or rules-based positive cohort impact measure of step/operation 1015, (ii) the negative cohort of step/operation 1003 (e.g., a rules-based negative cohort), (iii) the negative risk-based cohort of step/operation 1021 and the corresponding negative risk-based cohort impact measure of step/operation 1027, and/or (iv) the positive risk-based cohort of step/operation 1021 and the corresponding object impact measures of step/operation 1030. Additionally, or alternatively, in some embodiments, the risk scores of step/operation 1018 and/or the risk threshold are provided to the one or more client computing entities. For example, the predictive data analysis system 101 may provide the risk scores of step/operation 1018 and/or the risk threshold to one or more client computing entities 102. In some embodiments, the process 1000 is performed for a plurality of predictive labels, and, at step/operation 1033, cohorts and impact measures respective to each predictive label are provided to one or more client computing entities. For example, the predictive data analysis system 101 may the process 1000 to generate a plurality of cohorts and a plurality of impact measures for the plurality of cohorts, or individual data objects thereof, respective to each of a plurality of predictive labels. For each predictive label, the predictive data analysis system 101 may provide the corresponding cohorts, impact measures, risk scores, and/or risk threshold to one or more client computing entities 102.

In some embodiments, the process 1000 includes, at step/operation 1036, initiating the performance one or more predictive actions. For example, the predictive data analysis system 101 may initiate the performance of the one or more prediction actions. In some examples, a client computing entity 102 may initiate the performance of the one or more prediction actions. In some examples, a prediction action may include generating data constructs for determining a distribution of one or more resources to one or more cohorts of data objects and/or individual data objects based on the impact measures of steps/operations 1012, 1015, 1027, 1030. In some examples, a prediction action may include generating a predictive cost metric for the predictive outcome based on the impact measures of steps/operations 1012, 1015, 1027, 1030 and/or a determined distribution of one or more resources. In still another example, a prediction action may include generating action scripts based on (i) one or more of the impact measures of steps/operations 1012, 1015, 1027, 1030, (ii) one or more of the cohorts of data objects generated at steps/operations 1006, 1021, (iii) one or more of the risk scores generated at step/operation 1018, (iv) and/or a determined distribution of one or more resources. In yet another example, a prediction action may include generating one or more electronic communications, graphical user interfaces, and/or visual renderings based on one or more cohorts of data objects, impact measures, risk scores, and/or distributions of a resource generated via the process 1000.

In some embodiments, the process 1000 includes, at step/operation 1036, generating an optimal number of occurrences of a resource to distribute to each cohort of data objects and/or individual data objects. For example, the predictive data analysis system 101 may generate the optimal number of parameter occurrences based on the impact measures generated at steps/operations 1012, 1015, 1027, 1030. In some examples, in a clinical prediction domain, based on the impact measures of steps/operations 1012, 1015, 1027, 1030, the predictive data analysis system 101 generates an optimal number of clinical interactions to distribute to each member of the label-based positive cohort, the rules-based positive cohort, the positive risk-based cohort, and the negative risk-based cohort. In some embodiments, at step/operation 1036, a ranking of the label-based positive cohort, the rules-based positive cohort, the negative risk-based cohort, and each data object of the positive risk-based cohort is generated based on the impact measures of steps/operations 1012, 1015, 1027, 1030. For example, based on the impact measures of steps/operations 1012, 1015, 1027, 1030, the predictive data analysis system 101 may generate a ranking of the label-based positive cohort, the rules-based positive cohort, the negative risk-based cohort, and each data object of the positive risk-based cohort, where an ordering of the ranking is based on greatest impact measure (e.g., greatest predicted causal effect on a predictive outcome). In some examples, in a clinical prediction domain, the predictive data analysis system 101 ranks the label-based positive cohort, the rules-based positive cohort, the negative risk-based cohort, and each data object of the positive risk-based cohort based on predicted reduction in hospital admissions when an additional clinical interaction is distributed to the corresponding data objects.

By way of example, in at least a clinical prediction domain, the one or more predictive actions may include performing a resource-based action (e.g., distribution of a resource), generating a diagnostic report, generating action scripts, generating alerts or messages, generating one or more electronic communications, and/or the like. The one or more predictive actions may further include displaying visual renderings of the aforementioned examples of predictive actions in addition to values, charts, and representations associated with the third-party data sources and/or third-party datasets thereof.

Using the nonlinear causal inference and predictive data analysis techniques of the process 1000, additional cohorts and impact measures may be generated respective to one or more additional predictive labels. As shown and described in the present disclosure, the generated cohorts and impact measures may provide for utilization-efficient and cost-efficient distribution of a resource to data objects. In this manner, the predictive data analysis techniques of the process 1000 may be practically applied to improve upon traditional resource allocation techniques that (i) rely on generic deterministic rules or associative frameworks, (ii) fail to identify and account for instances of missing or inaccurate documentation for one or more data objects, and (iii) incorrectly assume that data objects with the greatest risk of a negative event are also the data objects that may benefit most from additional distributions of a resource.

Some techniques of the present disclosure enable the generation of action outputs that may be performed to initiate one or more predictive actions to achieve real-world effects. The non-linear causal inference techniques of the present disclosure may be used, applied, and/or otherwise leveraged to (i) generate cohorts of data objects respective to association with a predictive label, and (ii) generate impact measures for the cohorts of data objects and/or individual data objects respective to a predictive outcome. These outputs may be leveraged to initiate the performance of various computing tasks that improve the performance of a computing system (e.g., a computer itself, etc.) with respect to various predictive actions performed by the computing system.

In some examples, the computing tasks may include predictive actions that may be based on a prediction domain. A prediction domain may include any environment in which computing systems may be applied to achieve real-word insights, such as predictions, and initiate the performance of computing tasks, such as predictive actions, to act on the real-world insights. These predictive actions may cause real-world changes, for example, by controlling a hardware component, providing targeted alerts, automatically allocating computing or human resources, and/or the like.

Examples of prediction domains may include financial systems, clinical systems, industrial processing systems, digital graphic rendering systems, autonomous systems, robotic systems, and/or the like. Predictive actions in such domains may include automated computing resource allocation actions, automated adjustments to computing and/or human resource management, the initiation of automated instructions across and between devices, automated notifications, automated scheduling operations, automated precautionary actions, automated security actions, automated data processing actions, automated server load balancing actions, and/or the like.

As one example, a prediction domain may include a clinical prediction domain. In such a case, the predictive actions may include automated distribution of clinical care resources and/or other resources to persons or healthcare programs, automated physician notification actions, automated patient notification actions, automated appointment scheduling actions, automated prescription recommendation actions, automated drug prescription generation actions, automated implementation of precautionary actions, automated record updating actions, automated datastore updating actions, automated hospital preparation actions, automated workforce management operational management actions, automated server load balancing actions, automated resource distribution actions, automated call center preparation actions, automated hospital preparation actions, automated pricing actions, automated healthcare program update actions, automated alert generation actions, and/or the like.

In some embodiments, the nonlinear causal inference and predictive data analysis techniques of the process 1000 are applied to initiate the performance of one or more predictive actions. As described herein, the predictive actions may depend on the prediction domain. In some examples, the process 1000 may leverage the nonlinear causal inference and data analysis prediction techniques to generate cohorts of data objects respective to a predictive label and generate impact measures for the cohorts of data objects, and/or individual data objects, for estimating causal effects on a predictive outcome. Using the impact measures and cohorts of data objects, the process 1000 may generate an action output that is optimized for achieving a target predictive outcome for the one or more data objects. These predictive insights may be leveraged to initiate the performance of the one or more predictive actions within a respective prediction domain. By way of example, the prediction domain may include a clinical prediction domain and the one or more predictive actions may include performing a resource-based action (e.g., distribution of a resource, such as a clinical interaction), generating a diagnostic report, generating action scripts, generating alerts or messages, generating one or more electronic communications, and/or the like. The one or more predictive actions may further include displaying visual renderings of the aforementioned examples of predictive actions in addition to values, charts, and representations associated with the third-party data sources and/or third-party datasets thereof.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method, the computer-implemented method comprising generating, by one or more processors, a plurality of data object cohorts from a dataset, wherein the plurality of data object cohorts comprises one or more positive cohorts with a first plurality of data objects associated with a predictive label, one or more negative cohorts with a second plurality of data objects unassociated with the predictive label, generating, by the one or more processors and using a positive causal inference model, a positive cohort impact measure for the one or more positive cohorts, generating, by the one or more processors and using a machine learning prediction model, a plurality of risk scores associated with the predictive label for the one or more negative cohorts, generating, by the one or more processors, a positive risk-based cohort and a negative risk-based cohort from the one or more negative cohorts based on the plurality of risk scores, and generating, by the one or more processors, an object impact measure for a particular data object of the positive risk-based cohort based on the plurality of risk scores, the positive cohort impact measure, and a negative cohort impact measure corresponding to the negative risk-based cohort.

Example 2. The computer-implemented method of example 1, wherein generating the positive risk-based cohort and the negative risk-based cohort from the one or more negative cohorts comprises comparing the plurality of risk scores to a risk threshold.

Example 3. The computer-implemented method of any of the preceding examples, further comprising generating the one or more positive cohorts and the one or more negative cohorts based on a comparison between one or more deterministic rules and one or more attributes associated with a plurality of data objects.

Example 4. The computer-implemented method of any of the preceding examples, further comprising generating, using a negative causal inference model, the negative cohort impact measure corresponding to the negative risk-based cohort.

Example 5. The computer-implemented method of example 4, wherein the positive causal inference model is associated with a first directed acyclic graph (DAG) that is indictive of one or more causal relationships between the one or more attributes and a predictive outcome for a positive data object associated with the predictive label, and the negative causal inference model is associated with a second DAG that is indicative of one or causal relationships between the one or more attributes and the predictive outcome for a negative data object that is unassociated with the predictive label.

Example 6. The computer-implemented method of any of the preceding examples, wherein the one or more positive cohorts comprises a rules-based positive cohort and a label-based positive cohort and the positive cohort impact measure is based on the rules-based positive cohort.

Example 7. The computer-implemented method of example 6, further comprising generating, using the positive causal inference model, a label-based positive cohort impact measure for the label-based positive cohort.

Example 8. The computer-implemented method of any of the preceding examples, wherein the machine learning prediction model comprises a neural network previously trained to generate a risk score indicative of a positive association between a data object and the predictive label.

Example 9. The computer-implemented method of any of the preceding examples, wherein the risk score is indicative of a probability that the data object is associated with the predictive label.

Example 10. A system comprising memory and one or more processors communicatively coupled to the memory, the one or more processors configured to generate a plurality of data object cohorts from a dataset, wherein the plurality of data object cohorts comprises one or more positive cohorts with a first plurality of data objects associated with a predictive label, one or more negative cohorts with a second plurality of data objects unassociated with the predictive label, generate, using a positive causal inference model, a positive cohort impact measure for the one or more positive cohorts, generate, using a machine learning prediction model, a plurality of risk scores associated with the predictive label for the one or more negative cohorts, generate a positive risk-based cohort and a negative risk-based cohort from the one or more negative cohorts based on the plurality of risk scores, and generate an object impact measure for a particular data object of the positive risk-based cohort based on the plurality of risk scores, the positive cohort impact measure, and a negative cohort impact measure corresponding to the negative risk-based cohort.

Example 11. The system of example 10, wherein the one or more processors are configured to generate the positive risk-based cohort and the negative risk-based cohort from the one or more negative cohorts by comparing the plurality of risk scores to a risk threshold.

Example 12. The system of any of the preceding examples, wherein the one or more processors are further configured to generate the one or more positive cohorts and the one or more negative cohorts based on a comparison between one or more deterministic rules and one or more attributes associated with a plurality of data objects.

Example 13. The system of any of the preceding examples, wherein the one or more processors are further configured to generate, using a negative causal inference model, the negative cohort impact measure corresponding to the negative risk-based cohort.

Example 14. The system of example 13, wherein the positive causal inference model is associated with a first directed acyclic graph (DAG) that is indictive of one or more causal relationships between the one or more attributes and a predictive outcome for a positive data object associated with the predictive label, and the negative causal inference model is associated with a second DAG that is indicative of one or causal relationships between the one or more attributes and the predictive outcome for a negative data object that is unassociated with the predictive label.

Example 15. The system of any of the preceding examples, wherein the one or more positive cohorts comprises a rules-based positive cohort and a label-based positive cohort and the positive cohort impact measure is based on the rules-based positive cohort.

Example 16. The system of example 15, wherein the one or more processors are further configured to generating, using the positive causal inference model, a label-based positive cohort impact measure for the label-based positive cohort.

Example 17. The system of any of the preceding examples, wherein the machine learning prediction model comprises a neural network previously trained to generate a risk score indicative of a positive association between a data object and the predictive label.

Example 18. The system of example 17, wherein the risk score is indicative of a probability that the data object is associated with the predictive label.

Example 19. One or more non-transitory, computer-readable storage media including instructions that, when executed by one or more processors, causes the one or more processors to generate a plurality of data object cohorts from a dataset, wherein the plurality of data object cohorts comprises one or more positive cohorts with a first plurality of data objects associated with a predictive label, one or more negative cohorts with a second plurality of data objects unassociated with the predictive label, generate, using a positive causal inference model, a positive cohort impact measure for the one or more positive cohorts, generate, using a machine learning prediction model, a plurality of risk scores associated with the predictive label for the one or more negative cohorts, generate a positive risk-based cohort and a negative risk-based cohort from the one or more negative cohorts based on the plurality of risk scores, and generate an object impact measure for a particular data object of the positive risk-based cohort based on the plurality of risk scores, the positive cohort impact measure, and a negative cohort impact measure corresponding to the negative risk-based cohort.

Example 20. The one or more non-transitory, computer-readable storage media of example 19, wherein the machine learning prediction model comprises a neural network previously trained to generate a risk score indicative of a positive association between a data object and the predictive label.

The invention claimed is:

1. A computer-implemented method, the computer-implemented method comprising:

generating, by one or more processors, a plurality of data object cohorts from a dataset, wherein the plurality of data object cohorts comprises:

one or more positive cohorts with a first plurality of data objects associated with a predictive label; and one or more negative cohorts with a second plurality of data objects unassociated with the predictive label;

generating, by the one or more processors and using a positive causal inference model, a positive cohort impact measure for the one or more positive cohorts;

generating, by the one or more processors and using a machine learning prediction model, a plurality of risk scores associated with the predictive label for the one or more negative cohorts;

generating, by the one or more processors, a positive risk-based cohort and a negative risk-based cohort from the one or more negative cohorts based on the plurality of risk scores; and generating, by the one or more processors, an object impact measure for a particular data object of the positive risk-based cohort based on the plurality of risk scores, the positive cohort impact measure, and a negative cohort impact measure corresponding to the negative risk-based cohort.

2. The computer-implemented method of claim 1, wherein generating the positive risk-based cohort and the negative risk-based cohort from the one or more negative cohorts comprises comparing the plurality of risk scores to a risk threshold.

3. The computer-implemented method of claim 2, further comprising:

generating the one or more positive cohorts and the one or more negative cohorts based on a comparison between one or more deterministic rules and one or more attributes associated with a plurality of data objects.

4. The computer-implemented method of claim 3, further comprising:

generating, using a negative causal inference model, the negative cohort impact measure corresponding to the negative risk-based cohort.

5. The computer-implemented method of claim 4, wherein:

the positive causal inference model is associated with a first directed acyclic graph (DAG) that is indictive of one or more causal relationships between the one or more attributes and a predictive outcome for a positive data object associated with the predictive label; and the negative causal inference model is associated with a second DAG that is indicative of one or causal relationships between the one or more attributes and the predictive outcome for a negative data object that is unassociated with the predictive label.

6. The computer-implemented method of claim 3, wherein the one or more positive cohorts comprises a rules-based positive cohort and a label-based positive cohort and the positive cohort impact measure is based on the rules-based positive cohort.

7. The computer-implemented method of claim 6 further comprising:

generating, using the positive causal inference model, a label-based positive cohort impact measure for the label-based positive cohort.

8. The computer-implemented method of claim 1, wherein the machine learning prediction model comprises a neural network previously trained to generate a risk score indicative of a positive association between a data object and the predictive label.

9. The computer-implemented method of claim 8, wherein the risk score is indicative of a probability that the data object is associated with the predictive label.

10. A system comprising memory and one or more processors communicatively coupled to the memory, the one or more processors configured to:

generate a plurality of data object cohorts from a dataset, wherein the plurality of data object cohorts comprises:

one or more positive cohorts with a first plurality of data objects associated with a predictive label; and one or more negative cohorts with a second plurality of data objects unassociated with the predictive label;

generate, using a positive causal inference model, a positive cohort impact measure for the one or more positive cohorts;

generate, using a machine learning prediction model, a plurality of risk scores associated with the predictive label for the one or more negative cohorts;

generate a positive risk-based cohort and a negative risk-based cohort from the one or more negative cohorts based on the plurality of risk scores; and generate an object impact measure for a particular data object of the positive risk-based cohort based on the plurality of risk scores, the positive cohort impact measure, and a negative cohort impact measure corresponding to the negative risk-based cohort.

11. The system of claim 10, wherein the one or more processors are configured to generate the positive risk-based cohort and the negative risk-based cohort from the one or more negative cohorts by comparing the plurality of risk scores to a risk threshold.

12. The system of claim 11, wherein the one or more processors are further configured to:

generate the one or more positive cohorts and the one or more negative cohorts based on a comparison between one or more deterministic rules and one or more attributes associated with a plurality of data objects.

13. The system of claim 12, wherein the one or more processors are further configured to:

generate, using a negative causal inference model, the negative cohort impact measure corresponding to the negative risk-based cohort.

14. The system of claim 13, wherein:

the positive causal inference model is associated with a first directed acyclic graph (DAG) that is indictive of one or more causal relationships between the one or more attributes and a predictive outcome for a positive data object associated with the predictive label; and the negative causal inference model is associated with a second DAG that is indicative of one or causal relationships between the one or more attributes and the predictive outcome for a negative data object that is unassociated with the predictive label.

15. The system of claim 12, wherein the one or more positive cohorts comprises a rules-based positive cohort and a label-based positive cohort and the positive cohort impact measure is based on the rules-based positive cohort.

16. The system of claim 15, wherein the one or more processors are further configured to:

generate, using the positive causal inference model, a label-based positive cohort impact measure for the label-based positive cohort.

17. The system of claim 10, wherein the machine learning prediction model comprises a neural network previously trained to generate a risk score indicative of a positive association between a data object and the predictive label.

18. The system of claim 17, wherein the risk score is indicative of a probability that the data object is associated with the predictive label.

19. One or more non-transitory, computer-readable storage media including instructions that, when executed by one or more processors, causes the one or more processors to:

generate a plurality of data object cohorts from a dataset,
wherein the plurality of data object cohorts comprises:
one or more positive cohorts with a first plurality of
data objects associated with a predictive label; and
one or more negative cohorts with a second plurality of
data objects unassociated with the predictive label;
generate, using a positive causal inference model, a
positive cohort impact measure for the one or more
positive cohorts;
generate, using a machine learning prediction model, a
plurality of risk scores associated with the predictive
label for the one or more negative cohorts;
generate a positive risk-based cohort and a negative
risk-based cohort from the one or more negative
cohorts based on the plurality of risk scores; and
generate an object impact measure for a particular data
object of the positive risk-based cohort based on the
plurality of risk scores, the positive cohort impact
measure, and a negative cohort impact measure corre-
sponding to the negative risk-based cohort.

20. The one or more non-transitory, computer-readable
storage media of claim 19, wherein the machine learning
prediction model comprises a neural network previously
trained to generate a risk score indicative of a positive
association between a data object and the predictive label.

\* \* \* \* \*